(12) United States Patent
Nakagawa

(10) Patent No.: US 6,956,748 B2
(45) Date of Patent: Oct. 18, 2005

(54) SWITCHING POWER SUPPLY APPARATUS

(75) Inventor: Shin Nakagawa, Tokyo (JP)

(73) Assignee: Fidelix Y.K., Tokyo (JP)

( * ) Notice: Subject to any disclaimer, the term of this patent is extended or adjusted under 35 U.S.C. 154(b) by 0 days.

(21) Appl. No.: 10/431,969

(22) Filed: May 8, 2003

(65) Prior Publication Data

US 2003/0218892 A1 Nov. 27, 2003

(30) Foreign Application Priority Data

| May 8, 2002 | (JP) | ......................................... 2002-170694 |
| Sep. 29, 2002 | (JP) | ......................................... 2002-320536 |
| May 6, 2003 | (JP) | ......................................... 2003-127812 |
| Oct. 21, 2003 | (JP) | ......................................... 2002-305880 |

(51) Int. Cl.$^7$ ........................... H02M 3/335; G05F 1/14
(52) U.S. Cl. ........................ 363/16; 363/76; 363/127; 323/255
(58) Field of Search ................. 363/16, 21.01, 363/40, 44, 55, 56.09, 75, 76, 127; 323/250, 251, 255, 358, 361

(56) References Cited

U.S. PATENT DOCUMENTS

| 4,184,197 A | | 1/1980 | Cuk et al. ....................... 363/16 |
| 4,257,087 A | | 3/1981 | Cuk ............................. 363/16 |
| 5,504,419 A | * | 4/1996 | Kull et al. .................... 323/358 |
| 6,005,780 A | | 12/1999 | Hua ............................. 363/20 |
| 6,304,460 B1 | * | 10/2001 | Cuk ............................. 363/16 |
| 6,310,444 B1 | * | 10/2001 | Chang .......................... 323/361 |

* cited by examiner

Primary Examiner—Jessica Han
(74) Attorney, Agent, or Firm—Norris, McLaughlin & Marcus

(57) ABSTRACT

A switching power supply apparatus which has an input power source; a transformer having a primary winding, a secondary winding, an input winding and a magnetic flux canceling winding being connected to the secondary winding in series; a main switch for switching an electric current going through the primary winding; a bypassing capacitor for bypassing the primary winding; a sub switch for clamping a surge voltage, which is generated in the primary winding; a clamping circuit constituted of the sub switch and a clamping capacitor; a first rectifying switch for rectifying an electric current going through the secondary winding and the magnetic flux canceling winding during when the main switch is being OFF; a second rectifying switch for rectifying an electric current going through the magnetic flux canceling winding during when the main switch is being ON; and a smoothing capacitor for smoothing an electric current going through the magnetic flux canceling winding; and the magnetic flux canceling winding is provided in a direction that is opposite to a direction of a magnetic flux generated by the input winding, the primary winding and the secondary winding; and wherein an intermediate tap is provided in the primary winding so as to supply an electric current coming from the input power source to the main switch via the input winding and the intermediate tap.

12 Claims, 21 Drawing Sheets

PRIOR ART

SWITCHING POWER SUPPLY APPARATUS

BACKGROUND OF THE INVENTION

1) Field of the Invention

The present invention relates to switching power supply apparatuses; particularly, relates to apparatuses where a DC magnetic flux component, which is generated in switching power supply apparatuses operating in such a condition that the magnetic flux generated in a transformer is unbalanced, is cancelled with the aid of output current or input current of the power supply apparatus, so that the efficiency of the apparatus is improved.

2) Related Art Statement

Such a switching power supply apparatus where a direct magnetic flux component generated in switching transformers is cancelled is disclosed in U.S. Pat. No. 6,304,460.

FIG. 30 shows an example of the power supply apparatus disclosed in U.S. Pat. No. 6,304,460. The circuit shown in FIG. 30 corresponds to that in FIG. 35b of U.S. Pat. No. 6,304,460. In order to make the following explanation easy the position of the windings are modified in FIG. 30, however, the circuits in FIG. 30 and FIG. 35b of U.S. Pat. No. 6,304,460 are electrically equivalent.

The basic operation of the circuit shown in FIG. 30 will be explained. The power supply apparatus comprises a DC power source 100, and a transformer 101; a main switch 103, a sub-switch 108, a bypass capacitor 102 and a clamping capacitor 109 are provided on the primary side of the transformer 101; rectifying switches 104 and 107, a smoothing capacitor 105 are provided on the secondary side to output a power to a load 106. The transformer 101 comprises a primary winding 101a and a secondary winding 102e, to which an input winding 101b and a magnetic flux canceling winding 101f are further coupled. The apparatus is arranged as a fryback converter where the primary winding 101a and the secondary winding 101e conduct an ON-OFF operation; the main switch 103 and the sub switch 108 are alternatively made ON with a short dead time so as to conduct a so-called active clamping, so that a soft switching operation (zero-voltage switching) is realized. The clamping capacitor 109 is for a voltage clamping; the bypass capacitor 102 is for keeping the plus side of the primary winding 101a at an AC earth voltage. The output from the DC power source 100 is supplied to the transformer 101 via the input winding 101b.

The electric current coming from the secondary winding 101e is rectified with the rectifying switch 104; then outputted to the smoothing capacitor 105 and the load resistance 106 via the magnetic flux canceling winding 101f. The inductance 101c is a leakage inductance of the input winding 101b or an external inductance, and the inductance 101g is a leakage inductance of the magnetic flux canceling winding 101f or an external inductance.

The rectifying switch 107 is arranged to become ON when the rectifying switch 104 is OFF, so that an electric current is continuously supplied to the smoothing capacitor 105 and the load resistance 106. More strictly, a gate signal is given to the rectifying switch 107 at a timing, which is a little earlier than the timing when the body diode of the rectifying switch 107 is made ON, so that a perfect ZVS (zero voltage switching) operation can be realized in the main switch 103.

In the conventional apparatus, the input winding 101b, the primary winding 101a, and the secondary winding 101e are wound so that the magnetic fluxes generated by these windings have the same direction, but the magnetic flux canceling winding 101f is provided to generate a magnetic flux having a direction that is opposite to the direction of the magnetic fluxes generated by the windings 101b, 101a and 101e. Therefore, by selecting an appropriate number of turns of the winding 101f, it is possible to arrange such that a DC magnetic flux component is not apt to be generated in the transformer 101. When the generation of the DC magnetic flux component is reduced, the gap of the core of the transformer can be made very thin or the gap is not necessary any more, therefore a high permeability can be obtained. Further, since the transformer operates in a working area having less iron loss as well, the number of turns of each winding can be made fewer; both a copper loss and an iron loss can be reduced as a result.

In the conventional apparatus, when the numbers of turn of the primary winding 101a and the input winding 101b are substantially the same, the high frequency current generated by the switching operation is not apt to flow to the input winding 101b and the DC power source 100, so that an EMI noise can be reduced. That is to say, the electric potential of the plus side of the input winding 101b becomes zero in an alternative manner and no potential difference is generated in the leakage inductance 101c, so that the high frequency current is not apt to flow.

At the secondary side of the transformer, when the duty ratio is 0.5, it is possible to prevent that the high frequency current goes to the magnetic flux canceling winding 101f by an arrangement that the number of turns of the magnetic flux canceling winding 101f is equivalently about half of that of the secondary winding 101e. (See, FIG. 33, U.S. Pat. No. 6,304,460). The term "equivalently half" means that, for instance, even when the number of turns of both the windings 101e and 101f is four (4) turns, the equivalent number of turns of the magnetic flux canceling winding 101f is only 2 turn by an arrangement that 50% of the magnetic flux going through the secondary winding 101e goes through in the magnetic flux canceling winding 101f. In the explanation below, the number of turns of the magnetic flux canceling winding means the "equivalent turn number".

From the point of view of magnetic saturation, when the duty ratio is 0.5, the best operating point where the magnetic saturation is not apt to be occurred, can be obtained by making the number of turns of the secondary winding 101e and the magnetic flux canceling winding 101f equivalently the same. Therefore, the number of turns of these windings may be determined as occasion demands, that the high frequency current is reduced in order to prevent the output ripple, or that the DC magnetic flux is reduced in order to limit the iron loss and the copper loss. It may be also possible to select a compromised number between these two occasions.

The leakage inductance 101c and 101g give a better effect to reduce the high frequency current. The detail of the transformer construction, that makes the leakage inductance larger, is disclosed in U.S. Pat. No. 6,304,460. However, since this is not actually related to the subject of the present invention, the explanation is omitted here. Briefly speaking, by adding an independent winding, that is not connected to the other windings, to an objected winding, where the increased leakage inductance is required. (See, reference LL, in FIGS. 32, 33, 39b, U.S. Pat. No. 6,304,460)

As mentioned above, the apparatus disclosed in U.S. Pat. No. 6,304,460 or the modified apparatus shown in FIG. 30 works in an appropriate manner by making a balance in the number of turns of each winding on the transformer and designing the magnetic circuit and the switching timings in an appropriate manner. That is to say, in the apparatus, the DC magnetic flux is cancelled and the main switch realize a perfect ZVS.

SUMMARY OF THE INVENTION

However, to improve the efficiency is an eternal theme for the engineers in the power supply apparatus field, therefore, the present invention further improves the apparatus in U.S. Pat. No. 6,304,460 from this point of view. That is to say, in the apparatus of U.S. Pat. No. 6,304,460, the copper loss of the input winding 101b and the primary winding 101a is still large; therefore the present invention has its purpose to provide a power supply apparatus where the copper loss is further reduced to obtain a better efficiency.

In addition, according to the apparatus of U.S. Pat. No. 6,304,460, in order to perform the zero volt switching operation, it is necessary to control at least three switches, i.e. the main switch (103), the sub switch (108) and the rectifying switch (107), or four switches, i.e. the rectifying switch (104) in addition to the above mentioned three switches, with a delicate timing to adjust the dead time there between. Therefore, in the apparatus of U.S. Pat. No. 6,304,460, it is required to newly design a control circuit for controlling these three or four switches. Further, in the apparatus of U.S. Pat. No. 6,304,460, a switch at the high side should be driven in order to perform an active clamping. Furthermore, particularly for the isolated type power supply apparatus, it is required to control each switch, while isolating the two switches provided on the secondary side.

As mentioned above, the convention apparatus shown in U.S. Pat. No. 6,304,460 has an excellent benefits from the point of view that the copper loss and the iron loss are small and the apparatus can be made compact. However, it has a problem that the control circuit for switches is very complicated. The present invention has for its second purpose to provide a power supply apparatus where a normal controlling IC for controlling a switching power apparatus can be used to control the switches and the DC magnetic flux can be reduced as well as the apparatus in U.S. Pat. No. 6,304,460.

Furthermore, a converter, such as fryback converter, boost converter, forward converter, and irregular fryback converter, that operates in a condition that the magnetic flux is unbalanced, has a problem that the transformer is apt to have a magnetic saturation when the apparatus is applied to deal with a large amount of electric power. The present invention has its third purpose to provided a power supply apparatus, that does not cause a magnetic saturation even if the apparatus is applied to these converters, where the number of turns of the windings of the apparatus shown in U.S. Pat. No. 6,304,460 is elaborated.

In order to achieve the first purpose, the power supply apparatus according to the present invention is constituted to provide a tap in the primary winding and to connect the tap to the minus side of the input winding. According to this construction, the copper loss and the iron loss can be further reduced and therefore a better efficiency can be obtained.

Further, in order to achieve the second and third purposes, the power supply apparatus according to the present invention provides an improvement of the apparatus disclosed in U.S. Pat. No. 6,304,460, where the surge voltage clamping circuit is elaborated and the circuit construction is simplified so that the improvement can be applied a converter, which is able to work with a general controlling IC for controlling switching apparatus, i.e. fryback converter, boost converter, forward converter and irregular fryback converter. As a result, it becomes easier to control the switching element(s) of the apparatus and the gap between the cores can be made narrower or no gap is necessary. Therefore, the number of turns of windings can be made fewer so that the copper loss and the iron loss are reduced and thus a higher efficiency can be achieved.

More concretely, the switching power supply apparatus according to the present invention comprises an input power source; a transformer having a primary winding, a secondary winding, an input winding and a magnetic flux canceling winding being connected to said secondary winding in series; a main switch being connected to an end of said primary winding for switching an electric current going through said primary winding; a bypassing capacitor for bypassing the other end of said primary winding; a sub switch for clamping a surge voltage, which is generated in said primary winding; a clamping circuit comprising said sub switch and a clamping capacitor being connected to said sub switch in series and being connected to said primary winding in parallel; a first rectifying switch for rectifying an electric current going through said secondary winding and said magnetic flux canceling winding, which are connected to each other in series, during when said main switch is being OFF; a second rectifying switch for rectifying an electric current going through said magnetic flux canceling winding during when said main switch is being ON; and a smoothing capacitor for smoothing an electric current going through said magnetic flux canceling winding; and wherein said magnetic flux canceling winding is provided in a direction which is opposite to a direction of a magnetic flux generated by said input winding, said primary winding and said secondary winding; and wherein an intermediate tap is provided in said primary winding so as to supply an electric current coming from said input power source to said main switch via said input winding and said intermediate tap. (corresponding to FIG. 2a)

It should be noted that a P-channel FET or a PNP transistor may be preferably used for said sub switch (FIG. 7a); said transformer may comprise a clamping winding, to which said clamping circuit is connected (FIG. 6a), and said transformer may further comprise a driving winding for driving said sub switch (FIG. 5a).

Further, the switching power supply apparatus according to the invention comprises an input power source; a transformer comprising a primary winding, an end of which is connected to said input power source, a secondary winding, a magnetic flux canceling winding being connected to said secondary winding in series; a main switch being connected to the other end of said primary winding for switching an electric current going through said primary winding; a sub switch for clamping a surge voltage generated in said primary winding; a clamping circuit comprising said sub switch and a clamping capacitor being connected to said sub switch in series; a first rectifying switch for rectifying an electric current going through said secondary winding and said magnetic flux canceling winding, which are connected to each other in series, during when said main switch is being OFF; a secondary switch for rectifying an electric current going through said magnetic flux canceling winding during when said main switch is being ON; and a smoothing capacitor for smoothing an electric current going through said magnetic flux canceling winding; wherein said magnetic canceling winding is provided in a direction which is opposite to a direction of magnetic flux generated by said primary winding and said secondary winding. (corresponding to FIG. 3a).

It should be noted that a P-channel FET or a PNP transistor may be preferably used for said sub switch (FIG. 7b); said transformer may comprise a clamping winding, to which said clamping circuit is connected (FIG. 6b), and said transformer may further comprise a driving winding for driving said sub switch (FIG. 5b).

Furthermore, the switching power supply apparatus according to the invention comprises an input power source; a transformer comprising a primary winding, a secondary winding, an input winding and a magnetic flux canceling winding being connected to said secondary winding in series; a main switch being connected an end of said primary winding for switching an electric current going through the primary winding; a bypassing capacitor for bypassing the other end of said primary winding; a rectifying switch for rectifying an electric current going through said secondary winding and said magnetic flux canceling winding, which are connected to each other in series, during when said main switch is being OFF; a first smoothing capacitor for storing a current rectified by said rectifying switch; and a second smoothing capacitor for smoothing an electric current coming from said first smoothing capacitor to said magnetic flux canceling winding during when said main switch is being ON; wherein said input winding is connected to said one end of said primary winding, or said input winding comprises an intermediate tap and said input winding is being connected to said intermediate tap; and wherein said magnetic flux canceling winding is provided in a direction which is opposite to a direction of magnetic flux generated by said input winding, said primary winding and said secondary winding. (corresponding to FIG. 3a)

The switching power supply apparatus may be arranged such that a coupling capacitor is provided between said primary winding and said main switch; wherein said sub switch is provided between said main switch and the one end of said primary winding, which is opposite to the end where said coupling capacitor is provided; and said primary winding and said coupling capacitor, which are connected to each other in series, are connected to said sub switch in parallel. (FIG. 8a)

Further, said transformer further may comprise a driving winding for driving said sub switch (FIG. 8a).

Moreover, the switching power supply apparatus according to the invention comprises an input power source; a transformer comprising a primary winding an end of which is connected to said input power source, a secondary winding and a magnetic flux canceling winding being connected to said secondary winding in series; a main switch being connected to the other end of said primary winding for switching an electric current going through said primary winding; a rectifying switch for rectifying an electric current going through said secondary winding and said magnetic flux canceling winding, which are connected together in series, during when said main switch is being OFF; a first smoothing capacitor for storing an electric current rectified by said rectifying switch; and a second smoothing capacitor for smoothing an electric current coming from said first smoothing capacitor to said magnetic flux canceling winding; wherein said magnetic flux canceling winding is provided in a direction, which is opposite to a direction of the magnetic flux generated by said primary winding and said secondary winding. (corresponding to FIG. 3b)

The switching power supply apparatus may be arranged such that a coupling capacitor is provided between said primary winding and said main switch; wherein said sub switch is provided between said main switch and the one end of said primary winding, which is opposite to the end where said coupling capacitor is provided; and said primary winding and said coupling capacitor, which are connected to each other in series, are connected to said sub switch in parallel. (FIG. 8b)

Further, said transformer further may comprise a driving winding for driving said sub switch (FIG. 8b).

Moreover, the switching power supply apparatus according to the invention comprises an input power source; an input winding, a transformer comprising an intermediate winding which has an end being connected to the ground and a magnetic flux canceling winding that is connected to said intermediate winding in series; a coupling capacitor for coupling the other end of said intermediate winding; a main switch for switching an electric current being supplied from said input power source via said input winding and an electric current going through said intermediate winding via said coupling capacitor; a first rectifying switch for rectifying an electric current going through said intermediate winding and said magnetic flux canceling winding, which are connected together in series, during when said main switch is being OFF; a second rectifying switch for rectifying an electric current going through said magnetic flux canceling winding during when said main switch is being ON; and a smoothing capacitor for smoothing an electric current going through said magnetic flux canceling winding; wherein said magnetic flux canceling winding is provided in a direction which is opposite to a direction of magnetic flux generated by said input winding and said intermediate winding; wherein said apparatus is arranged such that a third rectifying switch is provided between said intermediate winding and said input power supply so that a current rectified by said third rectifying switch is recovered to an input current, or such that an intermediate tap is provided in said intermediate winding, and a fourth rectifying switch is provided between said intermediate tap and a load so that a current rectified by said fourth rectifying switch is outputted to said load. (corresponding to FIG. 17a)

Moreover, the switching power supply apparatus according to the invention comprises an input power source; a transformer comprising an input winding, a primary winding an end of which is connected to the ground, a secondary winding, and a magnetic flux canceling winding being connected to said secondary winding in series; a coupling capacitor for coupling the other end of said primary winding; a main switch for switching an electric current being supplied from said input power source via said primary winding and an electric current going through said primary winding via said coupling capacitor; a first rectifying switch for rectifying an electric current going through said secondary winding and said magnetic flux canceling winding, which are connected to each other in series, during when said main switch is being OFF; a second rectifying switch for rectifying an electric current going through said magnetic flux canceling winding during when said main switch is being ON; a smoothing capacitor for smoothing an electric current going through said magnetic flux canceling winding; wherein said magnetic flux canceling winding is provided in a direction which is opposite to a direction of magnetic flux generated by said input winding and said primary winding; wherein said apparatus is arranged in such a manner that a third rectifying switch is provided between said primary winding and said input power source so that a current rectified by said third rectifying switch is recovered to said input source, or such that an intermediate tap is provided in said secondary winding and a fourth rectifying switch is provided between said intermediate tap and a load so that a current rectified by said fourth rectifying switch is outputted to the load. (corresponding to FIG. 17b)

Moreover, the switching power supply apparatus according to the invention comprises an input power source; a transformer comprising a primary winding, a secondary winding, an input winding and a magnetic flux canceling winding being connected to said secondary winding in series; a main switch being connected to an end of said primary winding for switching an electric current going through said primary winding; a bypassing capacitor for bypassing the other end of said primary winding; a first rectifying switch for rectifying an electric current going through said secondary winding and said magnetic flux canceling winding, which are connected together in series, during when said main switch is being ON; a second rectifying switch for rectifying an electric current going through said magnetic flux canceling winding during when said main switch is being OFF; a smoothing capacitor for smoothing an electric current going through said magnetic flux canceling winding; wherein said magnetic flux canceling winding and said secondary winding are provided in a direction, which is opposite to a direction of magnetic flux generated by said input winding and said primary winding; wherein an electric current coming from said input power source is supplied to said one end of the primary winding, or to an intermediate tap which is provided in said primary winding. (corresponding to FIG. 10a)

Moreover, the switching power supply apparatus according to the invention comprises an input power supply, a transformer comprising a primary winding, an end of which is connected to said input power source, a secondary winding, and a magnetic flux canceling winding being connected to said secondary winding in series; a main switch being connected to the other end of said first winding for switching an electric current going through said primary winding; a first rectifying switch for rectifying an electric current going through said secondary winding and said magnetic flux canceling winding, that are connected together in series, during when said main switch is being ON; a second rectifying switch for rectifying an electric current going through said magnetic flux canceling winding during when said main switch is OFF; and a smoothing capacitor in parallel for smoothing an electric current going through said magnetic flux canceling winding; wherein said magnetic flux canceling winding and said secondary winding are provided in a direction which is opposite to a direction to magnetic flux generated by said primary winding. (corresponding to FIG. 10b)

Moreover, the switching power supply apparatus according to the invention comprises an input power source; a transformer comprising a primary winding, an input winding, and a magnetic flux canceling winding being connected to said primary winding in series; a main switch being connected an end of said primary winding for switching an electric current going through said primary winding; a bypassing capacitor for bypassing the other end of said primary winding; a rectifying switch for rectifying an electric current going through said primary winding and said magnetic flux canceling winding, which are connected to each other in series, during when said main switch is being OFF; a first smoothing capacitor for storing an electric current which is rectified by said rectifying switch; a second smoothing capacitor for smoothing an electric current which comes from said first smoothing capacitor to said magnetic flux canceling winding during when said main switch is being ON; wherein said apparatus is arranged in such a manner that an electric current from said input power source is supplied to said one end of said primary winding via said input winding, or that an intermediate tap is provided in said primary winding so that said electric current from said input power supply is supplied to said intermediate tap; and wherein said magnetic flux canceling winding is provided in a direction, which is opposite with respect to a direction of magnetic flux generated by said input winding and primary winding. (corresponding to FIG. 4a)

Moreover, the switching power supply apparatus according to the invention comprises an input power source; a transformer comprising a primary winding an end of which is connected to said input power source, and a magnetic flux canceling winding being connected to said primary winding in series; a main switch being connected to the other end of said primary winding for switching an electric current going through said primary winding; a rectifying switch for rectifying an electric current going through said primary winding and said magnetic flux canceling winding, which are connected together in series, during when said main switch is being OFF; a first smoothing capacitor for storing an electric current rectified by said first rectifying switch; and a second smoothing capacitor for smoothing an electric current going from said first smoothing capacitor to said magnetic flux canceling winding during when said main switch is being ON; wherein said magnetic flux canceling winding is provided in a direction opposite to a direction of magnetic flux generated by said primary winding. (corresponding to FIG. 4b)

Moreover, the fryback converter according to the invention comprises an input power source; a transformer comprising a magnetic flux canceling winding, a primary winding, and a secondary winding; a bypassing capacitor for bypassing an end of said primary winding; a main switch being connected to the other end of said primary winding for switching an electric current going through said primary winding; a rectifying switch for rectifying an electric current going through said secondary winding during when said main switch is being OFF; and a smoothing capacitor for storing an electric current rectified by said rectifying switch; wherein an electric current is supplied to said bypassing capacitor via said magnetic flux canceling winding; and wherein said magnetic flux canceling winding is provided in an direction which is opposite to a direction of magnetic flux direction generated by said primary and secondary windings. (corresponding to FIG. 18)

Moreover, the boost converter according to the invention comprises an input power source; a transformer comprising a magnetic flux canceling winding and a primary winding; a bypassing capacitor for bypassing an end of said primary winding; a main switch being connected to the other end of said primary winding for switching an electric current going through said primary winding; a rectifying switch for rectifying an electric current going through said primary winding during when said main switch is being OFF; and a smoothing capacitor for storing an electric current rectified by said rectifying switch; wherein an electric current is supplied to said bypassing capacitor via said magnetic flux canceling winding; and wherein said magnetic flux canceling winding is provided in a direction which is opposite to a direction of magnetic flux generated by said primary winding. (corresponding to FIG. 19)

Moreover, the switching power supply apparatus according to the invention comprises an input power source; a transformer comprising a magnetic flux canceling winding, a primary winding, and a secondary winding; a main switch being connected to an end of said primary winding for switching an electric current going through said primary winding; a bypassing capacitor for bypassing the other end of said primary winding; a coupling capacitor being provided between said primary winding and said main switch; a sub switch being provided between said main switch and said other end of said primary winding; a rectifying switch for rectifying an electric current going through said secondary winding during when said main switch is being OFF; and a smoothing capacitor for storing an electric current rectified by said rectifying switch; wherein an electric current from said input power source is supplied to said bypassing capacitor via said magnetic flux canceling winding, or an intermediate tap that is provided in said primary winding; and wherein said magnetic flux canceling winding is provided in a direction which is opposite to a direction of magnetic flux generated by said primary and secondary windings. (corresponding to FIG. 20)

It should be noted that said transformer may further comprises a driving winding for driving said sub switch. (FIG. 20)

Moreover, the switching power supply apparatus according to the present invention comprises an input power source; a transformer comprising a primary winding, and a secondary winding; a main switch being connected to an end of said primary winding for switching an electric current going through said primary winding; a bypassing capacitor for bypassing the other end of said primary winding; an inductor being provided on a secondary side of said transformer; a first rectifying switch for rectifying an electric current going through said secondary winding and said inductor during when said main switch is being ON; a second rectifying switch for rectifying an electric current going through said inductor during when said main switch is being OFF; and a smoothing capacitor for smoothing an electric current going through said inductor; wherein an electric current coming from said input power source is supplied to said bypassing capacitor via said magnetic flux canceling winding, and wherein said magnetic flux canceling winding is provided in a direction which is opposite to a direction of magnetic flux generated by said primary winding. (corresponding to FIG. 21)

Moreover, the switching power supply apparatus according to the present invention comprises an input power source; a transformer comprising a primary winding, a secondary winding, an input winding and a magnetic flux canceling winding being connected to said secondary winding in series; a main switch being connected to an end of said primary winding for switching an electric current going through said primary winding; a bypassing capacitor for bypassing the other end of said primary winding; a first rectifying switch for rectifying electric current going through said secondary winding and said magnetic flux canceling winding, which are connected to each other in series, during when said main switch is being OFF; a second rectifying switch for rectifying an electric current going through said magnetic flux canceling winding during when said main switch is being ON; a smoothing capacitor for smoothing an electric current going through said magnetic flux canceling winding; wherein an electric current coming from said input power source is supplied to said one end of primary winding, or to a first intermediate tap that is provided in said primary winding; wherein said magnetic flux canceling winding is provided in a direction that is opposite to a direction of magnetic flux generated by said primary winding, secondary winding and said input winding; and wherein said secondary winding comprises a second intermediate tap or an additional winding, and a third rectifying switch is provided between said second intermediate tap and said load or between said another winding and said load, so that an output from said secondary winding or said additional winding is supplied to said load via said third rectifying switch. (corresponding to FIGS. 11 and 12)

Moreover, the switching power supply apparatus according to the present invention comprises an input power source; a transformer comprising a primary winding, a secondary winding, an input winding and a magnetic flux canceling winding being connected to said secondary winding in series; a main switch being connected to an end of said primary winding for switching an electric current going through said primary winding; a bypassing capacitor for bypassing the other end of said primary winding; a first rectifying switch for rectifying an electric current going through said secondary winding and said magnetic flux canceling winding, which are connected together in series, during when said main switch is being OFF; a secondary rectifying switch for rectifying an electric current going through said magnetic flux canceling winding during when said main switch is being ON; a smoothing capacitor for smoothing an electric current going through said magnetic flux canceling winding; wherein an electric current from said input power source is supplied to said one end of said input winding, or to a first intermediate tap which is provided in said primary winding, wherein said magnetic flux canceling winding is provided in a direction, which is opposite to a direction of magnetic flux generated by said primary winding, said secondary winding and said input winding; wherein said apparatus is arranged such that transformer further comprises a recovering winding and a third rectifying switch being connected to said recovering winding, so that an electric current from said recovering winding is supplied to said input power source or said bypassing capacitor via said third rectifying switch during when said main switch is being OFF. (corresponding to FIGS. 11 and 12)

Moreover, the switching power supply apparatus according to the present invention comprises an input power source; a transformer comprising a primary winding an end of which is connected to said input power source, a secondary winding, a magnetic flux canceling winding being connected to said secondary winding in series; a main switch being connected to the other end of said primary winding for switching an electric current going through said primary winding; a first rectifying switch for rectifying an electric current going through said secondary winding and said magnetic flux canceling winding, that are connected to each other in series, during when said main switch is being OFF; a second rectifying switch for rectifying an electric current going through said magnetic flux canceling winding during when said main switch is being ON; a smoothing capacitor for smoothing an electric current going through said magnetic flux canceling winding, wherein said magnetic flux canceling winding is provided in a direction that is opposite to a direction of magnetic flux generated by said primary and secondary windings; said apparatus is arranged in such a manner that said secondary winding has an intermediate tap or an additional winding, and a third rectifying switch is provided between said intermediate tap or said another winding and a load, so that an output from said secondary winding or said additional winding is supplied to the load via said third rectifying switch. (corresponding to FIG. 13)

Moreover, the switching power supply apparatus according to the present invention comprises an input power source; a transformer comprising a primary winding an end of which is connected to said input power supply, a secondary winding, a magnetic flux canceling winding being connected to said secondary winding in series; a main switch being connected to the other end of said primary winding for switching an electric current going through said primary winding; a first rectifying switch for rectifying an electric current going through said secondary winding and said magnetic flux canceling winding, which are connected to each other in series, during when said main switch is being OFF; a second rectifying switch for rectifying an electric current going through said magnetic flux canceling winding during when said main switch is being ON; a smoothing capacitor for smoothing an electric current going through said magnetic flux canceling winding, wherein said magnetic flux canceling winding is provided in a direction which is opposite to a direction of magnetic flux generated by said primary and secondary windings; wherein said apparatus is arranged in such a manner that said transformer further comprises a recovering winding and that a third rectifying switch is provided between said recovering winding and said input power source, so that an electric current from said recovering winding is supplied to said input power source via said third rectifying switch during when said main switch is being OFF. (corresponding to FIG. 13)

Moreover, the switching power supply apparatus according to the present invention comprises an input power source; a transformer comprising a primary winding, a secondary winding, and a magnetic flux canceling winding; an external inductor being connected to said secondary winding in series; a main switch being connected to an end of said primary winding for switching an electric current going through said primary winding; a bypassing capacitor for bypassing the other end of said primary winding; a first rectifying switch for rectifying an electric current going through said secondary winding and said external inductor, which are connected to each other in series, during when said main switch is being OFF; a second rectifying switch for rectifying an electric current going through said magnetic flux canceling winding and said external inductor during when said main switch is being ON; a smoothing capacitor for smoothing an electric current going through said external inductor, wherein an electric current from said in put power source is supplied to said one end of said primary winding through said input winding, or supplied to an intermediate tap which is provided in said primary winding; wherein said magnetic flux canceling winding is provided in a direction which is opposite to a direction of magnetic flux generated by said primary and secondary windings; wherein said apparatus is arranged in such a manner that an intermediate tap or an additional winding is provided in said secondary winding and a third rectifying switch is provided between said intermediate tap or said additional winding and a load, so that an output from said secondary winding is supplied to the load via said third rectifying switch. (corresponding to FIG. 15)

Moreover, the switching power supply apparatus according to the present invention comprises an input power source; a transformer comprising a primary winding, a secondary winding, a magnetic flux canceling winding; an external inductor connected to said secondary winding in series; a main switch being connected to an end of said primary winding for switching an electric current going through said primary winding; a bypassing capacitor for bypassing the other end of said primary winding; a first rectifying switch for rectifying an electric current going through said secondary winding and said external inductor, which are connected to each other in series, during when said main switch is being OFF; a second rectifying switch for rectifying an electric current going through said magnetic flux canceling winding and said external inductor during when said main switch is being ON; a smoothing capacitor for smoothing an electric current going through said external inductor, wherein an electric current from said input power source is supplied to said one end of said primary winding through said input winding, or supplied to an intermediate tap which is provided in said primary winding; wherein said magnetic flux canceling winding is provided in a direction which is opposite to a direction of magnetic flux generated by said primary and secondary windings; wherein said transformer further comprises a recovering winding and a third rectifying switch is provided between said recovering winding and said input power source, so that an electric current from said recovering winding is supplied to said input power source or said bypassing capacitor via said third rectifying switch during when said main switch is being OFF. (corresponding to FIG. 15)

Moreover, the switching power supply apparatus according to the present invention comprises an input power source; a transformer comprising a primary winding an end of which is connected to said input power source, a secondary winding, and a magnetic flux canceling winding; an external inductor connected to said secondary winding in series; a main switch being connected to the other end of said primary winding for switching an electric current going through said primary winding; a first rectifying switch for rectifying an electric current going through said secondary winding and said external inductor, that are connected to each other in series, during when said main switch is being OFF; a second rectifying switch for rectifying an electric current going through said magnetic flux canceling winding and said external inductor during when said main switch is being ON; a smoothing capacitor for smoothing an electric current going through said external inductor, said magnetic flux canceling winding is provided in a direction that is opposite to a direction of magnetic flux generated by said primary and secondary windings; wherein an intermediate tap or an additional winding is provided in said secondary winding and a third rectifying switch is provided between said intermediate tap or said additional winding and a load, so that an output from said secondary winding or said additional winding is supplied to the load via said third rectifying switch. (corresponding to FIG. 14)

Moreover, the switching power supply apparatus according to the present invention comprises an input power source; a transformer comprising a primary winding an end of which being connected to said input power source, a secondary winding, a magnetic flux canceling winding; an external inductor connected to said secondary winding in series; a main switch being connected to the other of said primary winding for switching an electric current going through said primary winding; a first rectifying switch for rectifying an electric current going through said secondary winding and said external inductor, that are connected to each other in series, during when said main switch is being OFF; a second rectifying switch for rectifying an electric current going through said magnetic flux canceling winding and said external inductor during when said main switch is being ON; a smoothing capacitor for smoothing an electric current going through said external inductor; wherein said magnetic flux canceling winding is provided in a direction that is opposite to a direction of magnetic flux generated by said primary and secondary windings; and wherein said transformer further comprises a recovering winding and a third rectifying switch is provided between said recovering winding and said input power source, so that an electric current from said recovering winding is supplied to said input power source via said third rectifying switch during when said main switch is being OFF. (corresponding to FIG. 14)

Moreover, the switching power supply apparatus according to the present invention comprises an input power source; a transformer comprising a primary winding, a secondary winding, a magnetic flux canceling winding being connected between said primary winding and said secondary winding; a main switch being connected to an end of said primary winding for switching an electric current going through said primary winding; an external inductor being connected to said secondary winding and said magnetic flux canceling winding in series; a first rectifying switch for rectifying an electric current going through said secondary winding and said external inductor, that are connected to each other in series, during when said main switch is being OFF; a second rectifying switch for rectifying an electric current going through said magnetic flux canceling winding and said external inductor during when said main switch is being ON; a smoothing capacitor for smoothing an electric current going through said external inductor, wherein said magnetic flux canceling winding is provided in a direction that is opposite to a direction of magnetic flux generated by said primary and secondary windings; and wherein a third rectifying switch is provided between said secondary winding and a load, or between an additional winding added to said secondary winding and said load, so that an output from said secondary winding or said additional winding is supplied to said load via said third rectifying switch. (corresponding to FIG. 16)

It should be noted that said input power source may be an alternative power source and said apparatus may further comprises a high frequency superimposing winding on the primary side of said transistor. (FIGS. 23, 24, 26, 27, 28 and 29)

It should also be noted that said input power source may an alternative power source and said apparatus may further comprises a high frequency superimposing capacitor or a high frequency superimposing diode on the primary side of said transformer. (FIGS. 23, 24 and 27)

BRIEF DESCRIPTION OF THE DRAWINGS

FIG. 9 is a graph illustrating electric current wave shapes of the circuit shown in FIG. 8a;

FIG. 22 is a circuit diagram depicting a further modification of the seventh embodiment shown in FIG. 6a;

DETAILED EXPLANATION OF THE PREFERRED EMBODIMENTS

Figure 1:
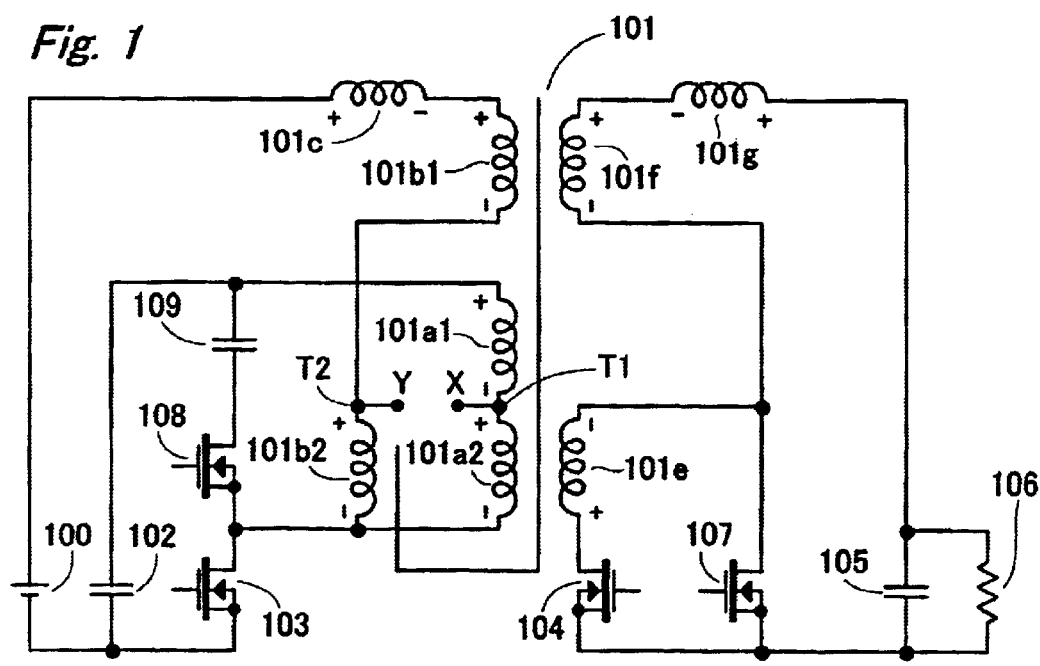
FIG. 1 is a circuit diagram for explaining a principle of the present invention.

FIG. 1 is a circuit diagram for the purpose of explaining the basic principle of the present invention. The reason why the efficiency is improved in the present invention will be explained on the basis of FIG. 1, comparing to the conventional apparatus shown in FIG. 30. It should be noted that the same reference numbers are used for the elements, which are the same ones in the circuit diagram of FIG. 30, in FIG. 1 and all embodiments explained below, therefore the explanation for each element is omitted here.

As shown in FIG. 1, in the apparatus according to the present invention, the primary winding of the transformer 101 is constituted of windings 101a1 and 101a2 and an intermediate tap T1 is provided between the windings 101a1 and 101a2. Further, the input winding 101b is constituted of windings 101b1 and 101b2 and an intermediate tap T2 is provided between the windings 101b1 and 101b2. The other constitution is the same as that in FIG. 30.

Figure 30:
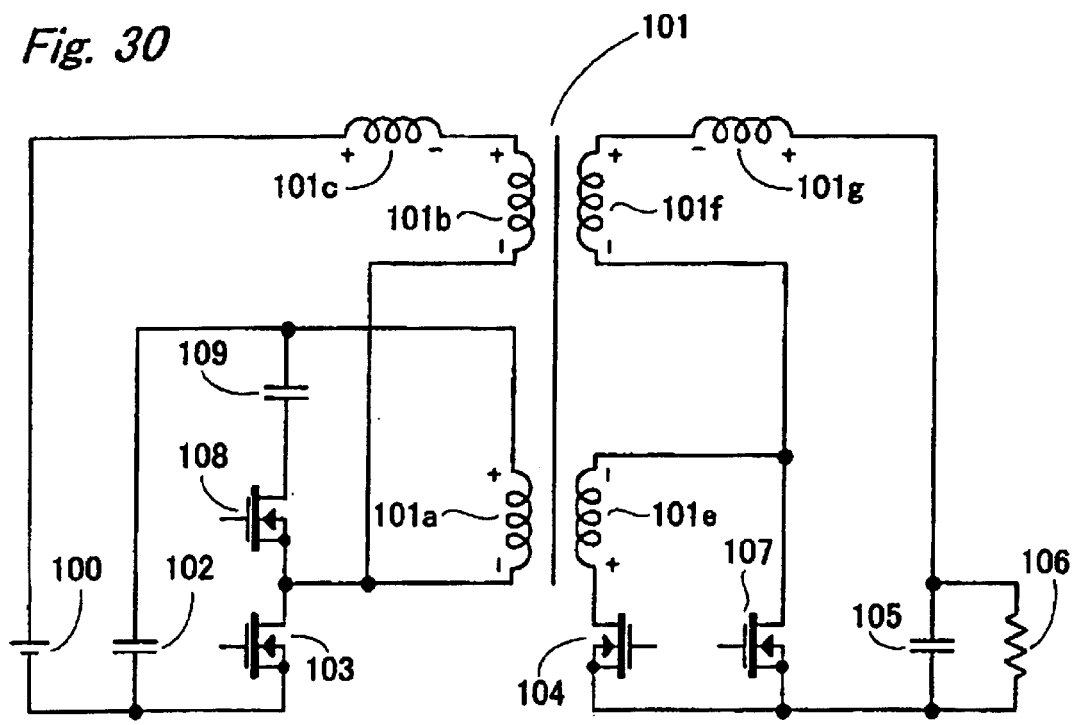
FIG. 30 is a circuit diagram depicting a construction of the conventional power supply apparatus.

In case that the specification is the same as that of the apparatus shown in FIG. 30, the primary windings 101a1 and 101a2 should be arranged in such a manner that the sum of the number of turns of the primary windings becomes the same as that of the primary winding 101a in FIG. 30. When the number of turns of the primary winding 101a1 is the same as that of the primary winding 101a2, it means that the tap T1 is provided in a center point X of the primary winding in FIG. 1.

On the other hand, the same arrangement is applied to the input winding 101b. That is to say, in case that the specification is the same as that of the apparatus shown in FIG. 30, the input windings 101b1 and 101b2 should be arranged in such a manner that the sum of the number of turns of the input windings becomes the same as that of the input winding 101b in FIG. 30. When the number of turns of the input winding 101b1 is the same as that of the input winding 101b2, it means that the tap T2 is provided in a center point Y of the input winding in FIG. 1.

If the points X and Y are not connected together, the circuit performs the same operation as that in FIG. 30. In this case, only a DC component flows through the input windings 101b1 and 101b2 side, while through the primary windings 101a1 and 101a2 side, only an alternating component flows. The potentials at the points X and Y are almost the same, but strictly speaking different.

When the points X and Y are connected together, the AC component also flows through the input winding 101b2 side, while the DC component also flows through the primary winding 101a2. Therefore, both the AC component and the DC component can easily flow the windings, so that the loss is reduced.

It is experimented by the present inventor that the efficiency is increased by 0.2% to 0.4% by connecting the points X and Y together. In the power supply apparatuses where a high efficiency is already realized, the fact cannot be denied that a heat generation is decreased due to the improvement of the efficiency.

Figure 2A:
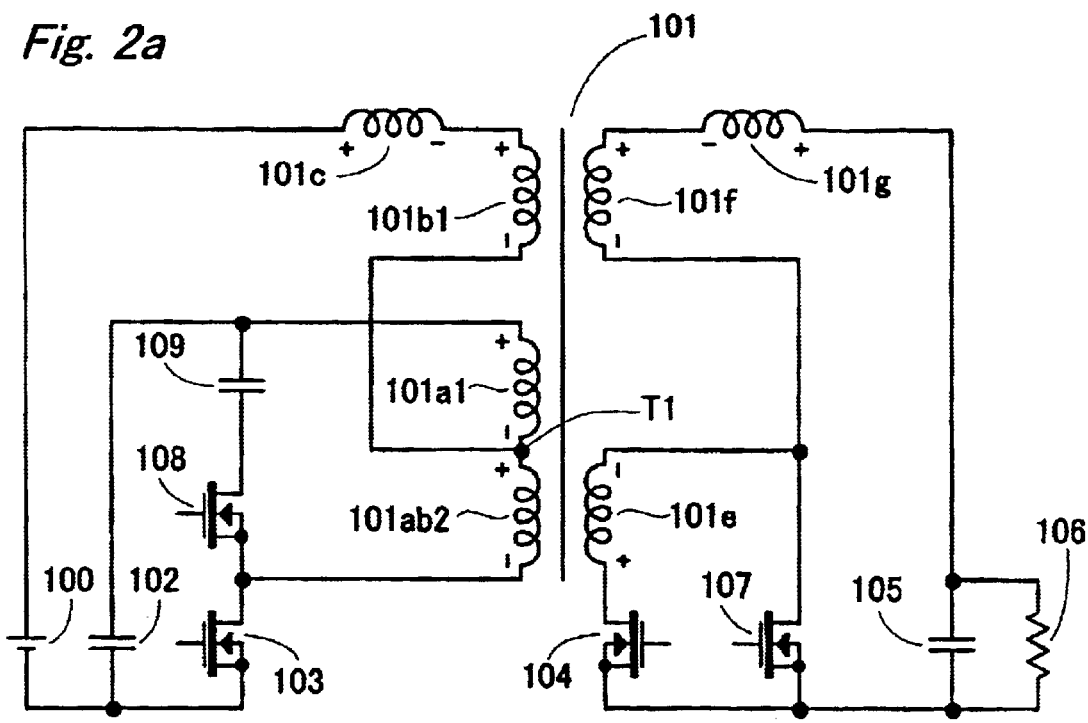
FIG. 2a is a circuit diagram showing the first embodiment of the present invention.

FIG. 2a is a circuit diagram showing the first embodiment of the present invention, where the points X and Y in FIG. 1 are connected together and the other portions are adjusted. That is to say, the parallel connected portions of the primary winding 101a2 and the input winding 101b2 are referred as 101ab2. The electric current coming from the input winding 101b is injected to the intermediate tap T1 provided in the primary winding. It should be noted that a high frequency current is apt not to flow in the input current by an arrangement that the intermediate tap T1 is provided just the half point of the primary winding and the number of turns of the input winding 101b1 becomes a half of that of the input winding 101b of the conventional apparatus in FIG. 30.

In this manner, the present invention is constituted such that the intermediate tap T1 is provided between the AC earth point caused by the bypass capacitor 102, i.e. the plus side of the primary winding 101a, and the AC switching point, i.e. the minus side of the primary winding 101a in FIG. 30, and the electric current is injected to the tap T1 via the input winding 101b (101b1), as shown in FIG. 2a. Therefore, the number of turns of the input winding can be reduced (in this embodiment, it becomes ½), and the loss is decreased. The number of turns of the input winding 101b may be changed in accordance with the position of the intermediate tap T1.

Figure 2B:
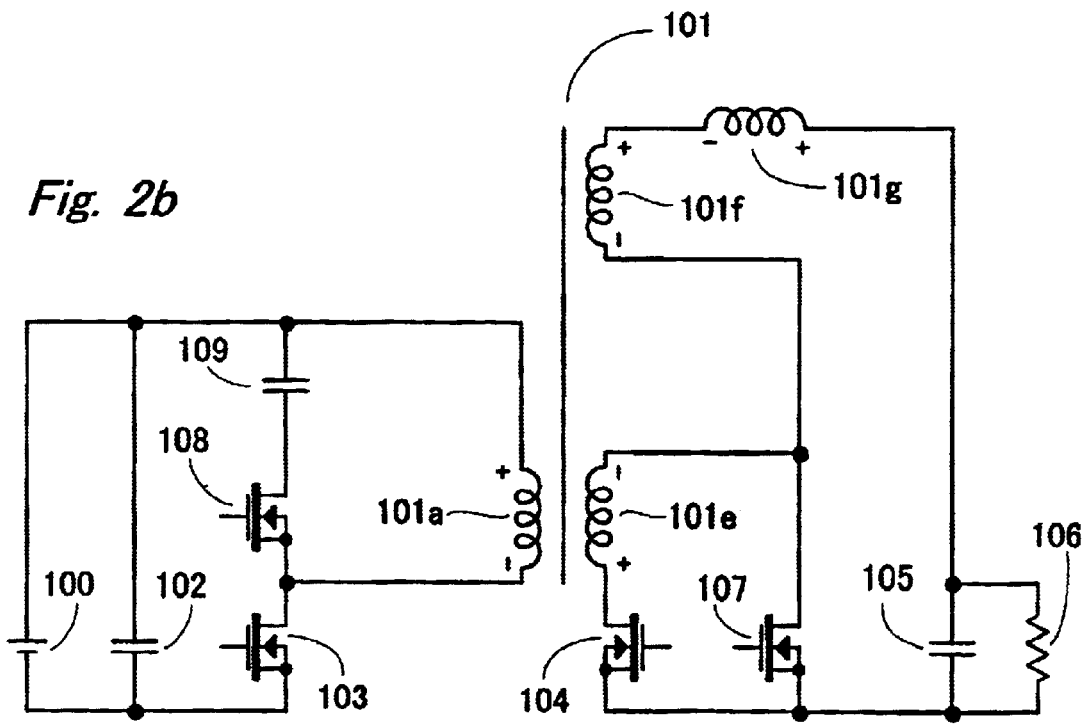
FIG. 2b is a circuit diagram depicting a modification of the first embodiment.

In case that a higher efficiency is expected despite that a high frequency current flows in the input current, it may be possible to arrange such that the intermediate tap T1 and the input winding 101b are removed and the DC supply 100 is directly connected to the bypass capacitor 102 as shown in FIG. 2b. This is an arrangement that the number of turns of the input winding is reduced to the limit, i.e. zero (0) turn.

Figure 3A:
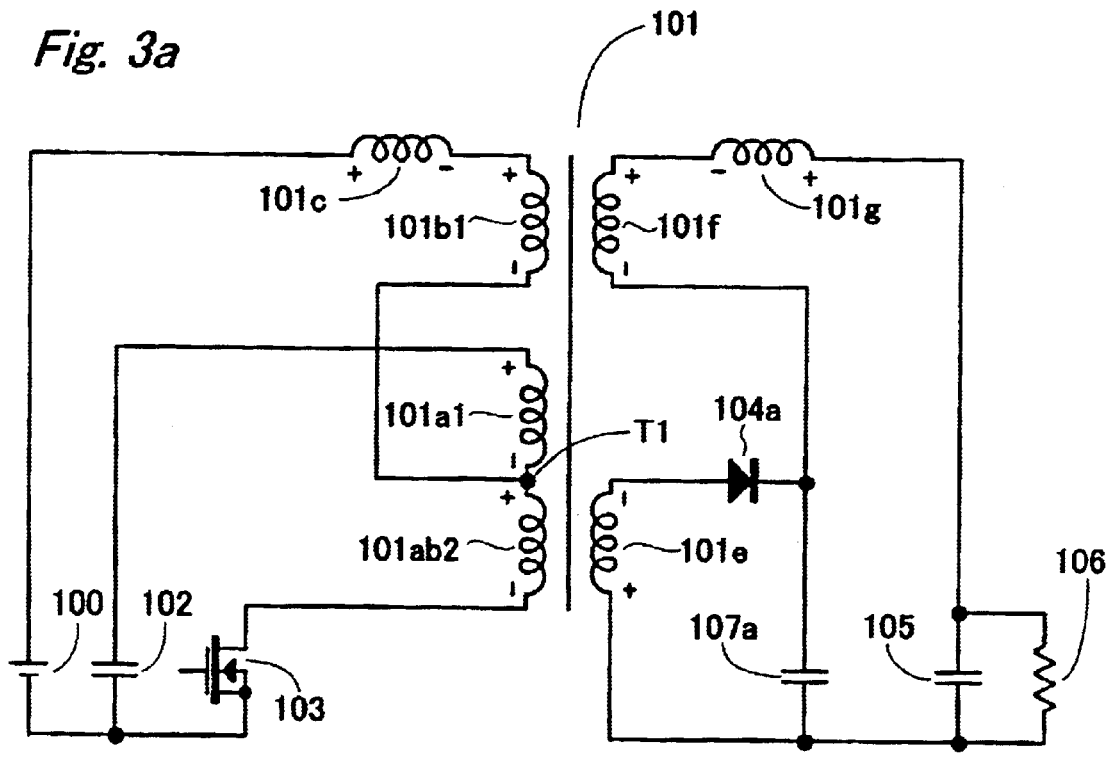
FIG. 3a is a circuit diagram illustrating the second embodiment of the present invention.

FIG. 3a is a circuit diagram showing the second embodiment of the present invention. In the second embodiment, the present invention is applied to a fryback converter, where the magnetic flux generated in the core is cancelled. In order to perform the most appropriate operation in the conventional power supply apparatus shown in FIG. 30, or the apparatus of the present invention shown in FIGS. 1, 2a and 2b, it is required to control the ON-OFF timings of at least three switches, i.e. the main switch 103, the sub switch 108 and the rectifying switch 107, in a delicate manner. In the second embodiment, the apparatus is arranged as a fryback converter, which is able to be controlled with only one switch, which is operable with a general IC for switching apparatuses; in addition, the same arrangement as explained in FIG. 2 that an intermediate tap T1 is provided in the primary winding, is applied and the connections is elaborated, so that the efficiency is also improved.

In the second embodiment, in order to use a general control IC for switching power supply apparatus, the sub switch 108 and the clamping capacitor 109 are removed, and the rectifying switch 107 is substituted by a capacitor 107a and the rectifying switch 104 is also substituted by a diode 104a, as shown in FIG. 3a. It is very important that the rectifying switch 107 is changed to the capacitor 107a. The reason is; if the rectifying switch 107 is used there, the sub switch 108 and the clamping capacitor cannot be removed, because if the switches 107 and 108 are removed, the surge voltage generated in the primary winding 101a cannot be clamped, so that abnormal voltage would be caused and then an appropriated operation could not be conducted.

In the apparatus shown in FIG. 3a, when the duty ratio is 0.5, the magnetic flux canceling winding 101f works out to cancel the DC magnetic flux generated in the core of the transformer 101 by an arrangement that the number of turns of the winding 101f is about two times of that of the secondary winding 101e. It should be noted that it is not always necessary to arrange the number of turns of the magnetic flux canceling winding 101f to be two times of the secondary winding 101e, but the number may be almost the same as that of the secondary winding 101e so as to just reduce the direct magnetic flux, preventing the magnetic saturation. The inductor 101g is a leakage inductance or an external inductance of the magnetic flux canceling winding 101f; the larger inductance is the better. In FIG. 3a, the winding 101ab2 may be zero turn.

Figure 3B:
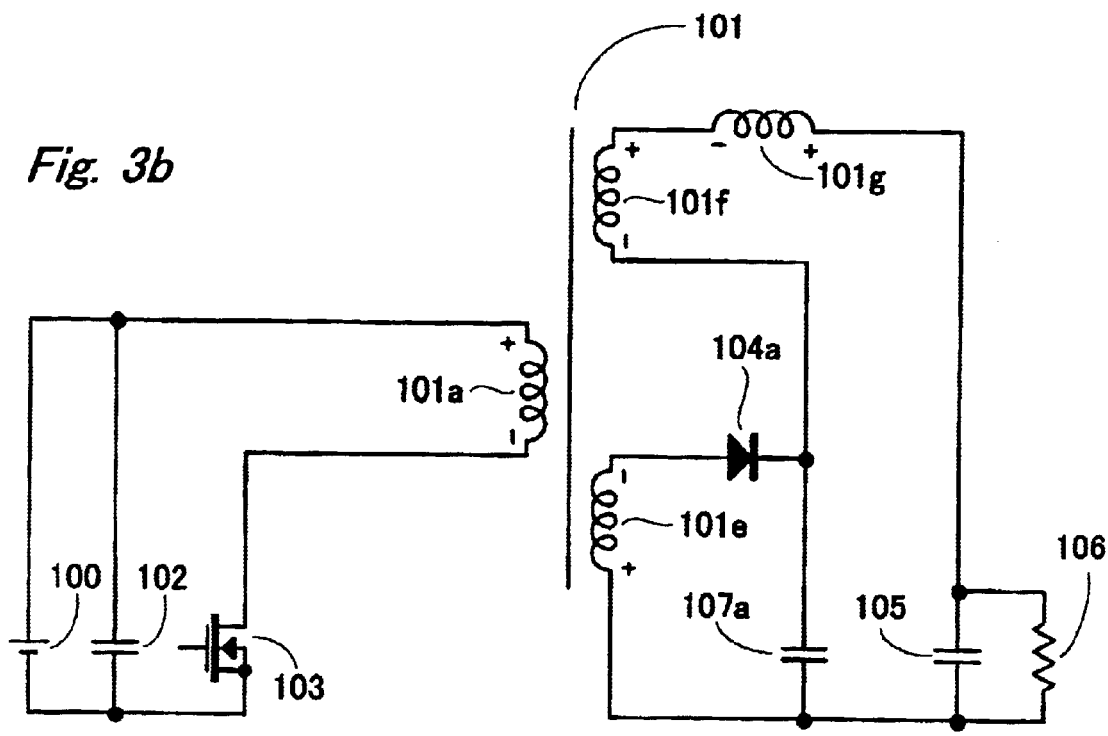
FIG. 3b is a circuit diagram representing a modification of the second embodiment.

In case that a higher efficiency is expected despite that a high frequency current flows in the input current, it may be possible to arrange such that the intermediate tap T1 and the input winding 101b are removed and the DC supply 100 is directly connected to the bypass capacitor 102 as shown in FIG. 3b. That is to say, in the modification shown in FIG. 3b, the intermediate tap T1 is arranged to be mostly closed to the bypass capacitor 102 side. The closer the tap T1 to the bypass capacitor, the higher the efficiency, while, the effect for reducing the high frequency current becomes lower. It is possible to reduce the high frequency current by making the capacity of the capacitor 102 large.

Figure 4A:
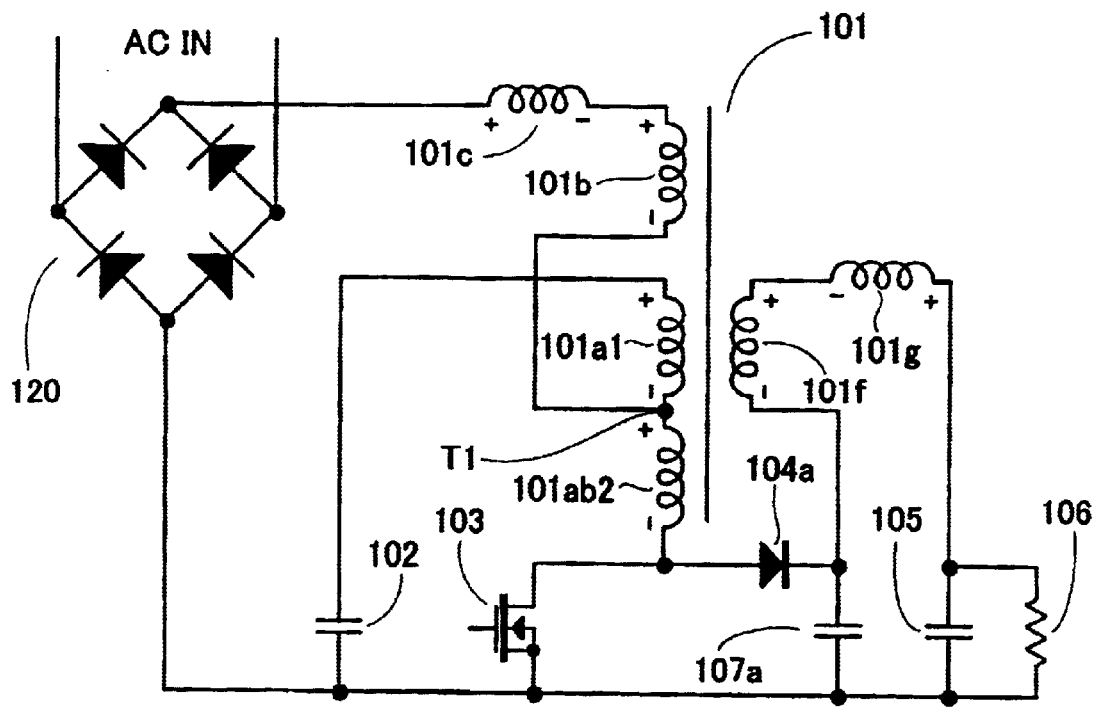
FIG. 4a is a circuit diagram showing the third embodiment of the present invention.

FIG. 4a is a circuit diagram illustrating a construction of the third embodiment of the present invention. In the third embodiment, the present invention is applied to a boost converter, where an AC power supply is rectified by a bridge diode 120. By selecting the capacitor of bypass capacitor 102 so as to keep the noise filtering effect but having no smoothing effect, the apparatus works as a PFC converter.

In the circuit illustrated in FIG. 4a, by an arrangement that the number of turns of the input winding 101b and the primary winding 101a1 are the same, the high frequency current becomes not apt to flow in the input current. Further, by an arrangement that the transformer has a large leakage inductance 101c, the better noise reducing effect can be obtained.

In the circuit shown in FIG. 4a, when the duty ratio is 0.5, the DC magnetic flux in the core can be perfectly canceled by such an arrangement that a number of turns of the magnetic flux canceling winding 101f is two times of that of the sum of the number of turns of the primary winding 101a1 and the winding 101ab2. As well as the second embodiment shown in FIG. 3a, the number of turns may be the same as the sum of the number of turns of the primary winding 101a1 and the winding 101ab2 so as to just reduce the direct magnetic flux preventing the magnetic saturation. The inductor 101g is a leakage inductance or an external inductance of the magnetic flux canceling winding 101f; the larger inductance is the better. In FIG. 4a, the winding 101ab2 could be zero turn.

Figure 4B:
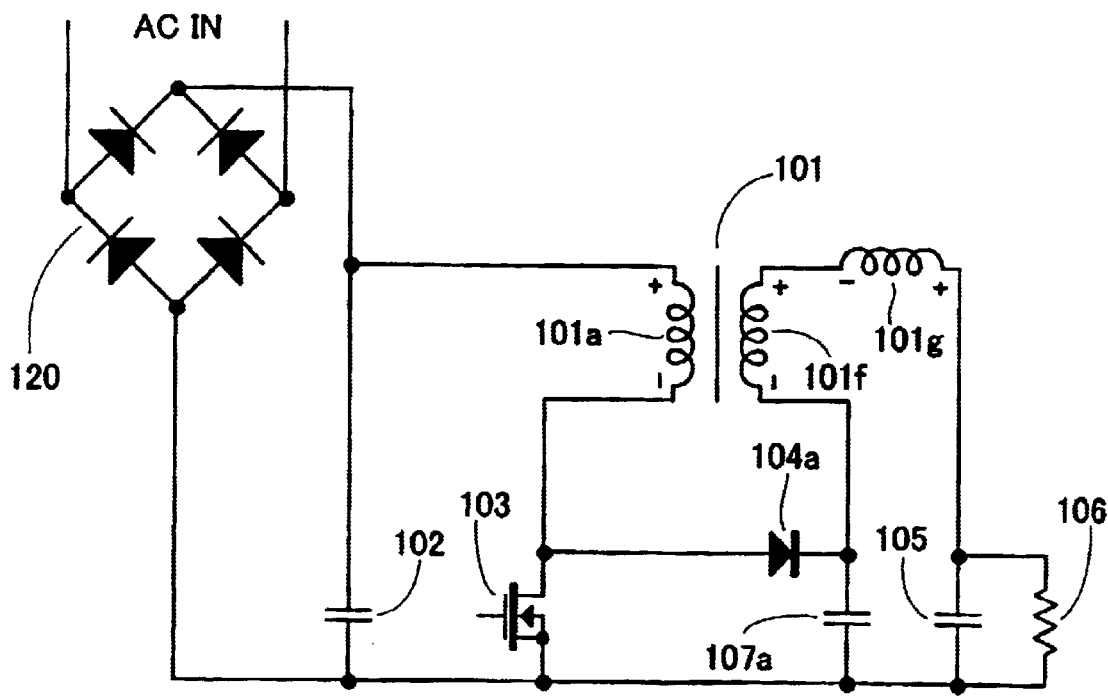
FIG. 4b is a circuit diagram depicting a modification of the third embodiment.

In case that a higher efficiency is expected despite that a high frequency current flows, it may be possible to arrange such that the intermediate tap T1 and the input winding 101b are removed and the DC supply 100 is directly connected to the bypass capacitor 102 as shown in FIG. 4b.

Figure 5A:
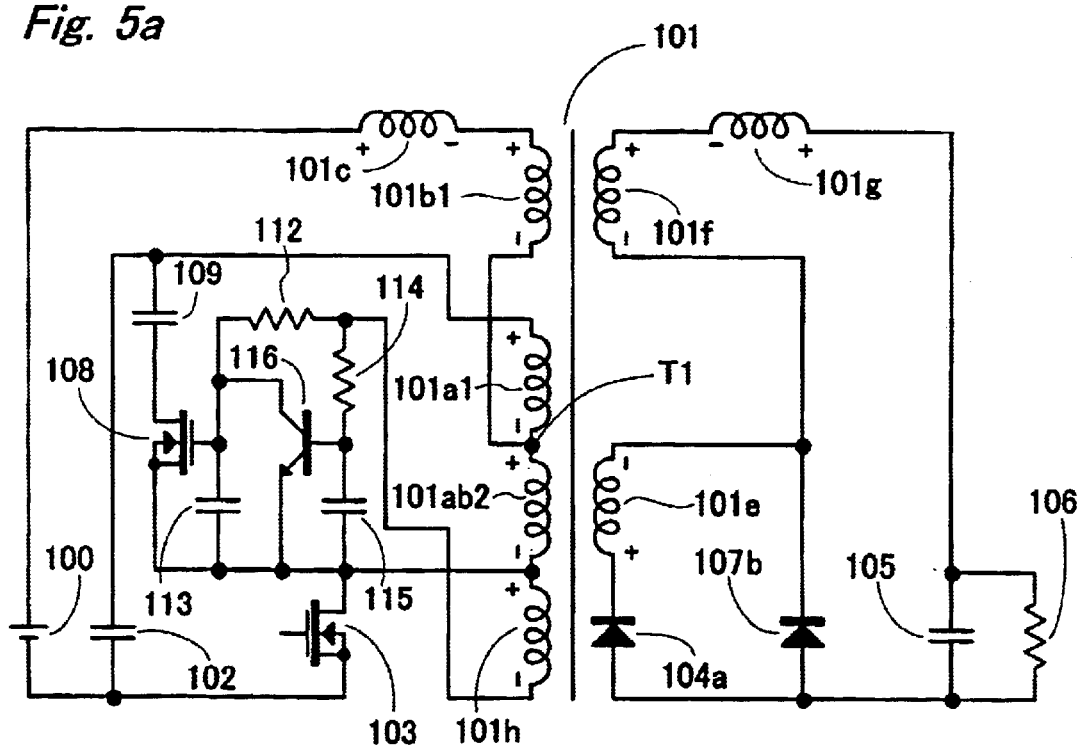
FIG. 5a is a circuit diagram illustrating the fourth embodiment of the present invention.

FIG. 5a is a circuit diagram depicting a construction of the fourth embodiment of the present invention. In the fourth embodiment, the apparatus shown in FIG. 2a is so modified that a general control IC for switching power supply apparatus can be used. The rectifying switches 104 and 107 are substituted to a diode 104a and a diode 107b; therefore it is not necessary to drive a rectifying switch in the fourth embodiment.

Here, how to drive the sub switch 108 is an issue. It may be possible to drive the sub switch with the aid of a high side driver, however, such a driver is expensive and when the input voltage is high, the power consumption when no load is applied becomes great. Therefore, in the fourth embodiment of the present application, an additional winding 101h is provided on the transformer 101h, so that the sub switch 108 is driven by the winding 101h.

In the fourth embodiment, it is arranged such that when the main switch 103 becomes OFF, the sub switch 108 is made ON with a delay of dead time, which is generated by a resistance 112 and a capacitor 113. To make the sub switch 108 OFF, a timer circuit constituted of a resistance 114 and a capacitor 115 is provided, that works to make compulsorily the gate of the sub switch 108 OFF by a transistor 116 after a given time has passed.

It is not difficult to make the main switch 103 ON after the sub switch 108 becomes OFF with a dead time. Such an IC may be used that has a function to detect a voltage at an additional winding (not shown) on the transformer 101 and to make the switch (sub-switch 108) ON with a time delay from the timing when the detected voltage reaches to a predetermined value: such an IC is easily available. However, in this case, the main switch is controlled by the ON time, so that the frequency is varied.

If the main switch 103 is operated in a critical current mode, the resistance 114, the capacitor 115 and the transistor 116, which are for making the sub switch 108 OFF, are not necessary, so that it becomes easier to drive the sub switch 108.

As well as the above-mentioned embodiments, the number of turns of the winding 101ab1 may be zero.

Figure 5B:
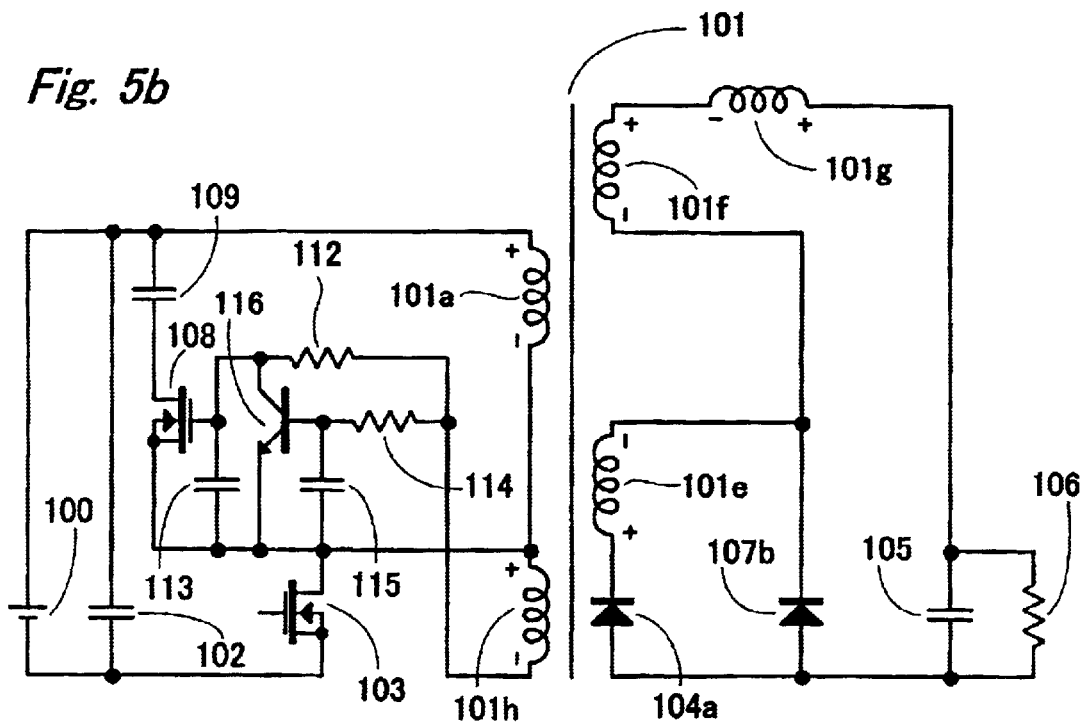
FIG. 5b is a circuit diagram representing a modification of the fourth embodiment.

In case that a higher efficiency is expected despite that a high frequency current flows, it may be possible to arrange such that the intermediate tap T1 and the input winding 101b are removed and the DC supply 100 is directly connected to the bypass capacitor 102 as shown in FIG. 5b.

Figure 6A:
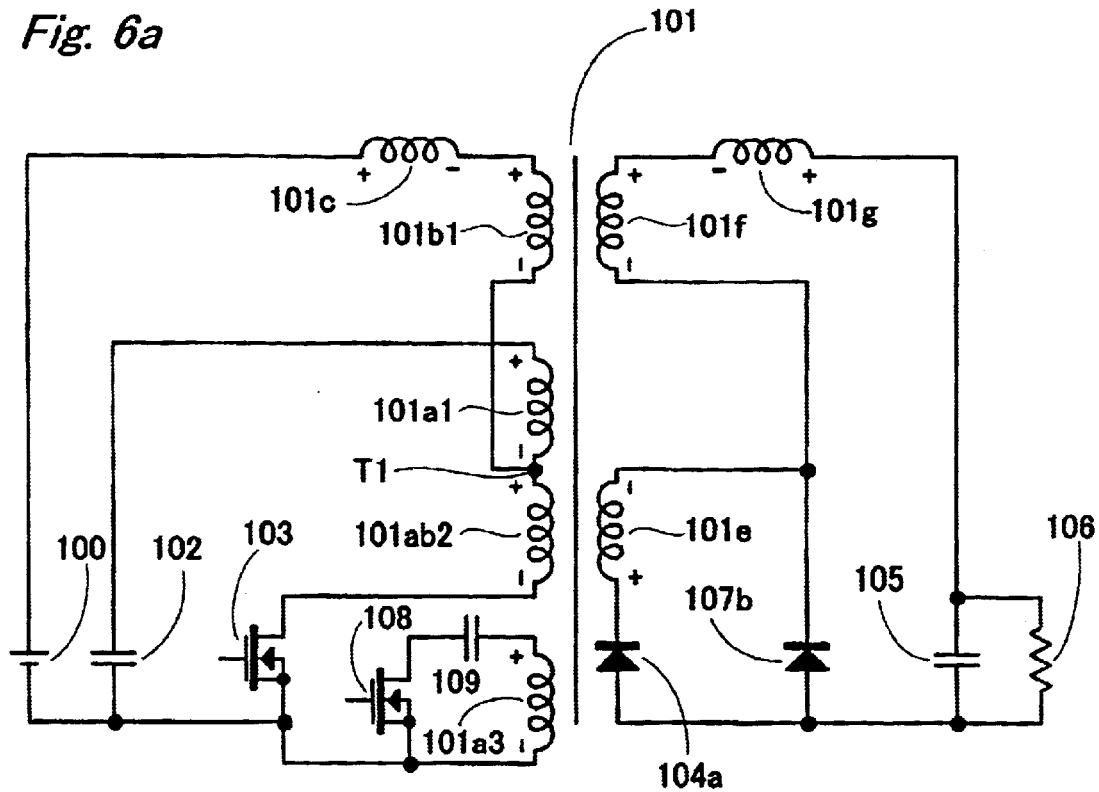
FIG. 6a is a circuit diagram showing the fifth embodiment of the present invention.

FIG. 6a is a circuit diagram illustrating the fifth embodiment of the present invention. In the fifth embodiment, the apparatus shown in FIG. 2a is arranged so that a general control IC for switching power supply apparatuses can be used. In the fifth embodiment, an additional primary winding 101a3 is added to the transformer 101 to perform an active clamping operation. By adding a simple inverting driver (not shown), the sub switch 108 can be driven. According to this arrangement, any type of controlling system can be used; that is to say, either the frequency fixed control or the frequency variable control can be performed. In the firth embodiment, the winding 101ab2 may also be zero turn.

In case that a higher efficiency is expected despite that a high frequency current flows, it may be possible to arrange such that the intermediate tap T1 and the input winding 101b are removed and the DC supply 100 is directly connected to the bypass capacitor 102 as shown in FIG. 5b.

Figure 7A:
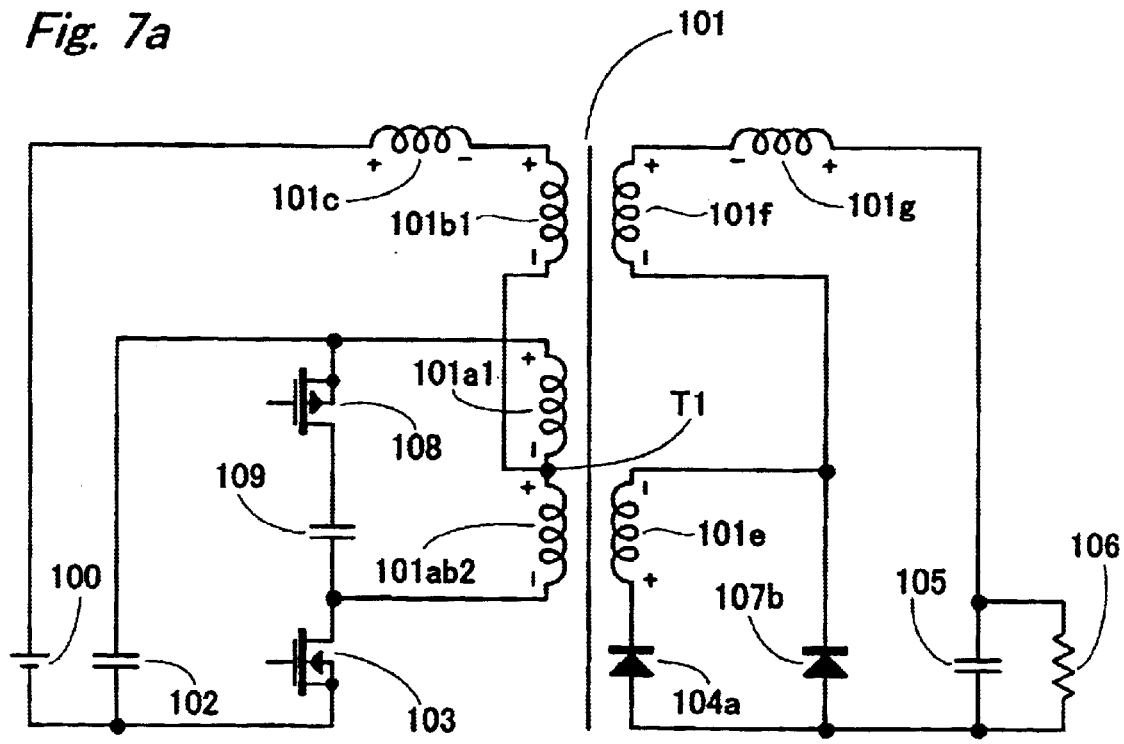
FIG. 7a is a circuit diagram illustrating the sixth embodiment of the present invention.
Figure 7B:
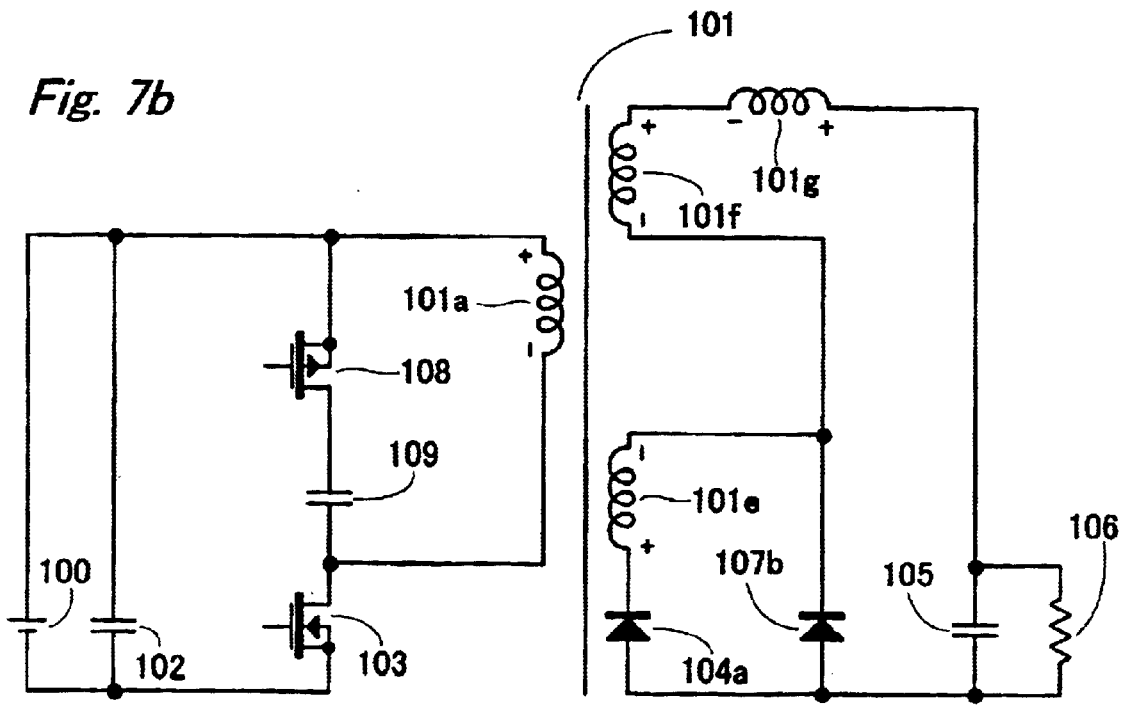
FIG. 7b is a circuit diagram representing a modification of the sixth embodiment.

FIG. 7a is a circuit diagram showing a construction of the sixth embodiment of the present invention. In the sixth embodiment, the apparatus shown in FIG. 2a is arranged so that a general control IC for switching power supply apparatuses can be used. In this embodiment, a P channel FET or a PNP transistor is used for the sub switch 108 to perform the active clamping operation.

As well as the fifth embodiment, the sub switch 108 can be driven by adding a simple driver (not shown). In this embodiment, there is no limitation for the control system. The winding 101ab2 may also be zero turn.

Figure 6B:
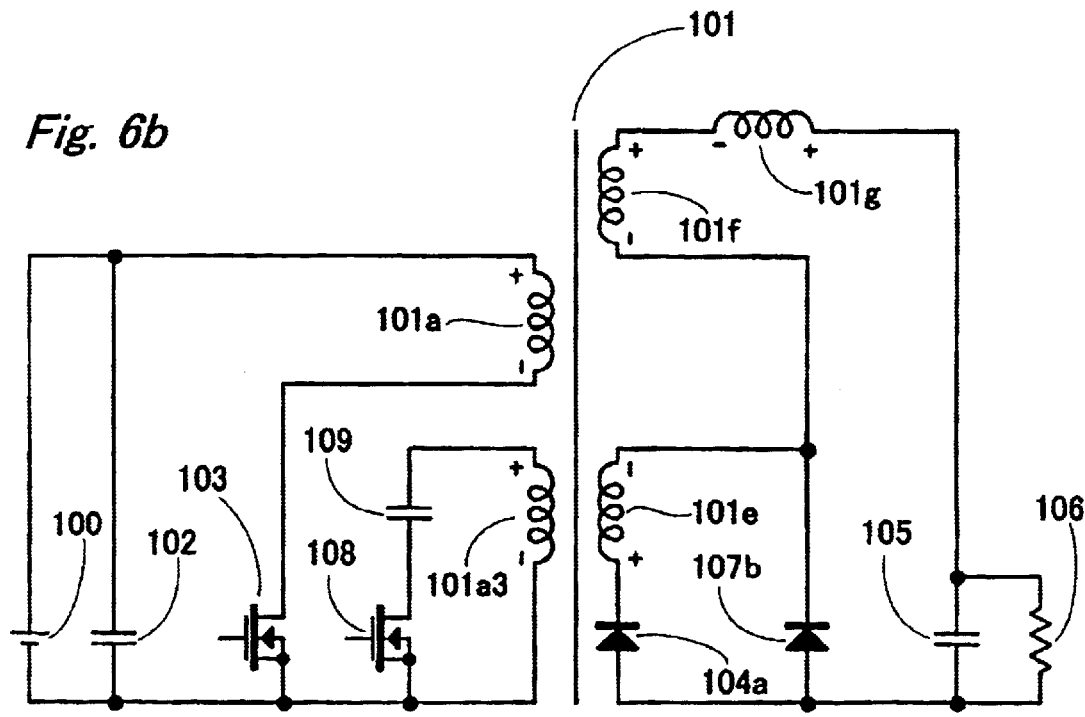
FIG. 6b is a circuit diagram depicting a modification of the fifth embodiment.

In case that a higher efficiency is expected despite that a high frequency current flows, it may be possible to arrange such that the intermediate tap T1 and the input winding 101b are removed and the DC supply 100 is directly connected to the bypass capacitor 102 as shown in FIG. 6b.

Figure 8A:
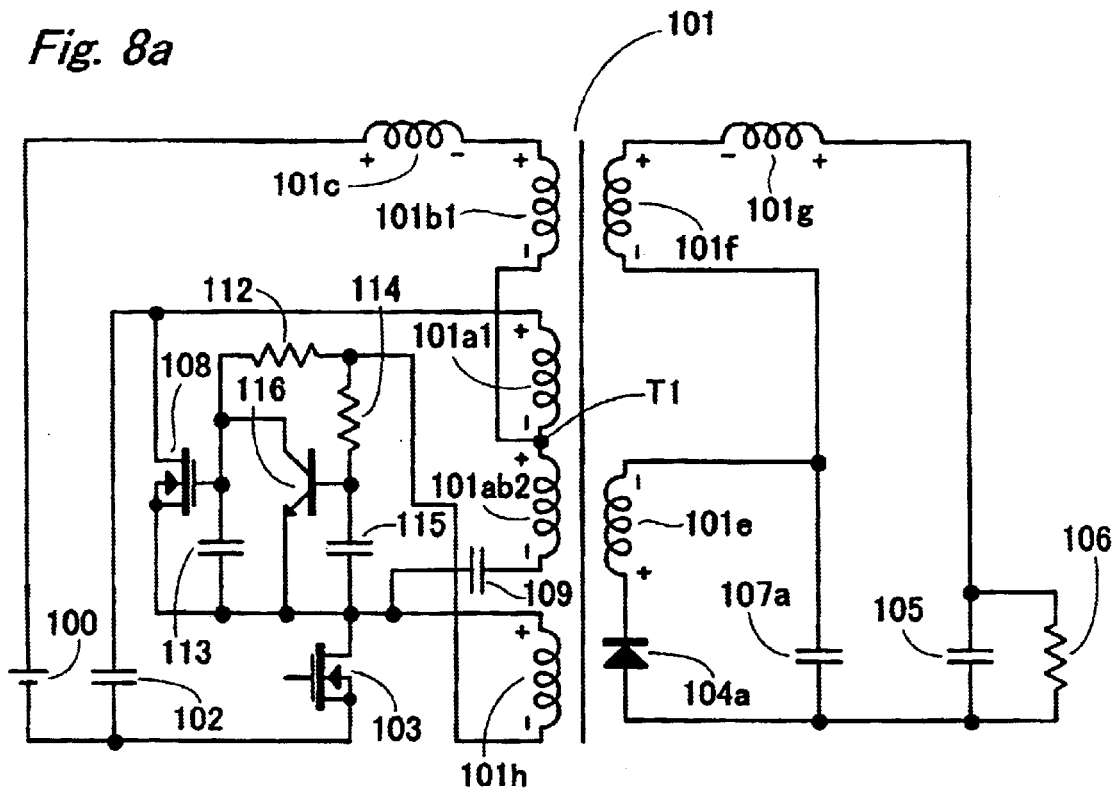
FIG. 8a is a circuit diagram showing the seventh embodiment of the present invention.

FIG. 8a is a circuit diagram illustrating a construction of the seventh embodiment of the present invention. In this embodiment, the present invention is applied to an irregular fryback converter, where the magnetic flux of the core is canceled. The main switch 103 and the sub switch 108 are alternatively made ON with a little dead time. At the primary side, it is like a half bridge connection, while the secondary side is arranged to achieve a half-wave rectification.

Figure 9:
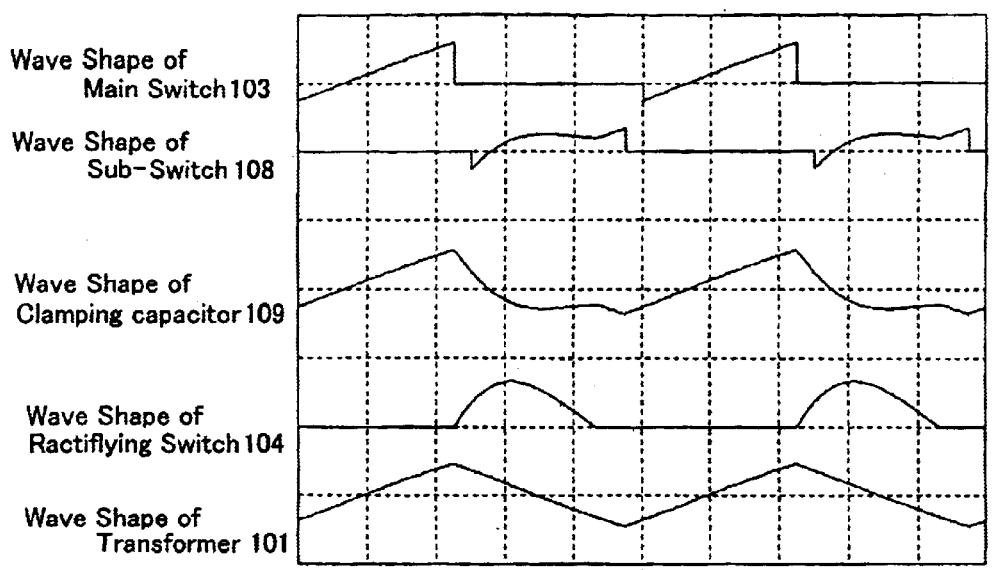

In the converter shown in FIG. 8a, since the ON time of the main switch 103 is controlled, the frequency varies. The detail of the operation of the switch 103 is not the subject of the present invention, therefore, the explanation is omitted here. The wave shapes of the magnetic flux of switches 103 and 108, the clamping capacitor 109, the diode 104a at the secondary side, and the transformer are shown in FIG. 9.

In the seventh embodiment, when the number of turns of the input winding 101b1 is almost the same as that of the primary winding 101a1, the high frequency current becomes to be apt not to flow in the input current. In this embodiment, the rectification and smoothing at the secondary side are performed with the diode 104a and the capacitor 107a. When the duty ratio is 0.5, the DC magnetic flux generated in the transformer can be almost canceled by an arrangement that the number of turns of the magnetic flux canceling winding 101f makes the same as that of the secondary winding 101e. It may be possible to arrange such that the number of turns of the magnetic flux canceling winding 101f is about a half of that of the secondary winding 101e so as to only reduce the DC magnetic flux. As well as the above-mentioned embodiments, the number of turns of the winding 101ab1 may be zero.

Figure 8B:
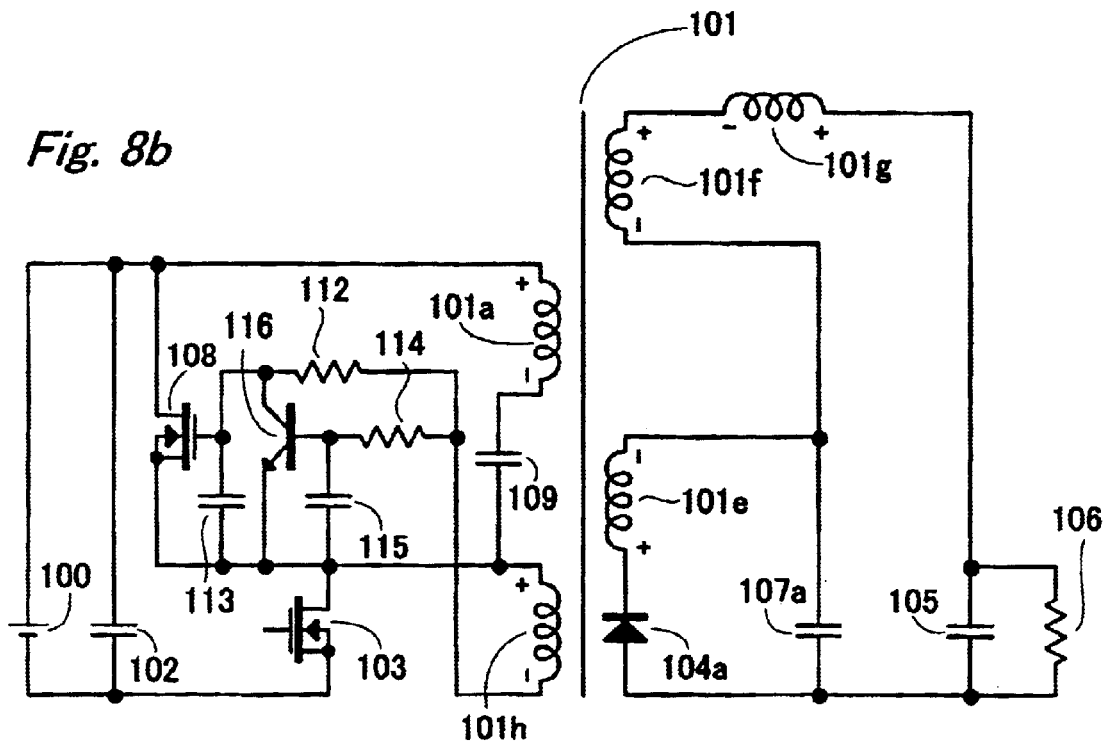
FIG. 8b is a circuit diagram depicting a modification of the seventh embodiment.

In case that a higher efficiency is expected despite that a high frequency current flows, it may be possible to arrange such that the intermediate tap T1 and the input winding 101b are removed and the DC supply 100 is directly connected to the bypass capacitor 102 as shown in FIG. 8b.

Figure 10A:
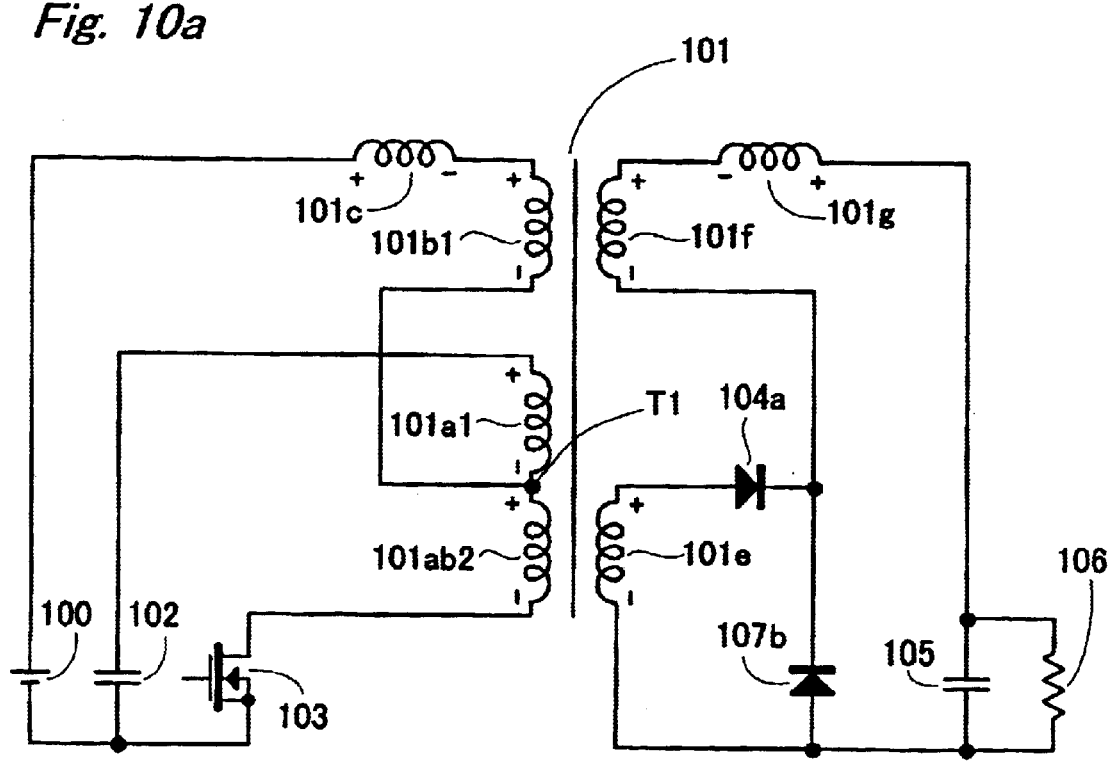
FIG. 10a is a circuit diagram representing the eighth embodiment of the present invention.

FIG. 10 is a circuit diagram representing the eighth embodiment of the present invention. In the eight embodiment, the apparatus of the second embodiment shown in FIG. 3a is arranged as a forward converter, where the polarity of the secondary winding 101e is reversed and the rectifying circuit is changed to a diode 107b. It should be noted that a sunaber circuit and a reset circuit are omitted here. It is preferred that the winding 101g, which is a free wheel inductor, is connected to the transformer 101, achieving a large leakage inductance. An external inductor can be also used.

In the eighth embodiment, the apparatus can be operated with the main switch 103 only. The apparatus operates without an active clamping, however, an active clamping function may be adapted. In this embodiment, the number of turns of the magnetic flux canceling winding 101f may be one to fifth to one to tenth (⅕~ 1/10) of that of the secondary winding 101e. Further, when the number of turns of the winding 101f is less than one, it may be possible to divide the electric current going through the winding 101f. As well as the above-mentioned embodiments, the number of turns of the winding 101ab1 may be zero.

Figure 10B:
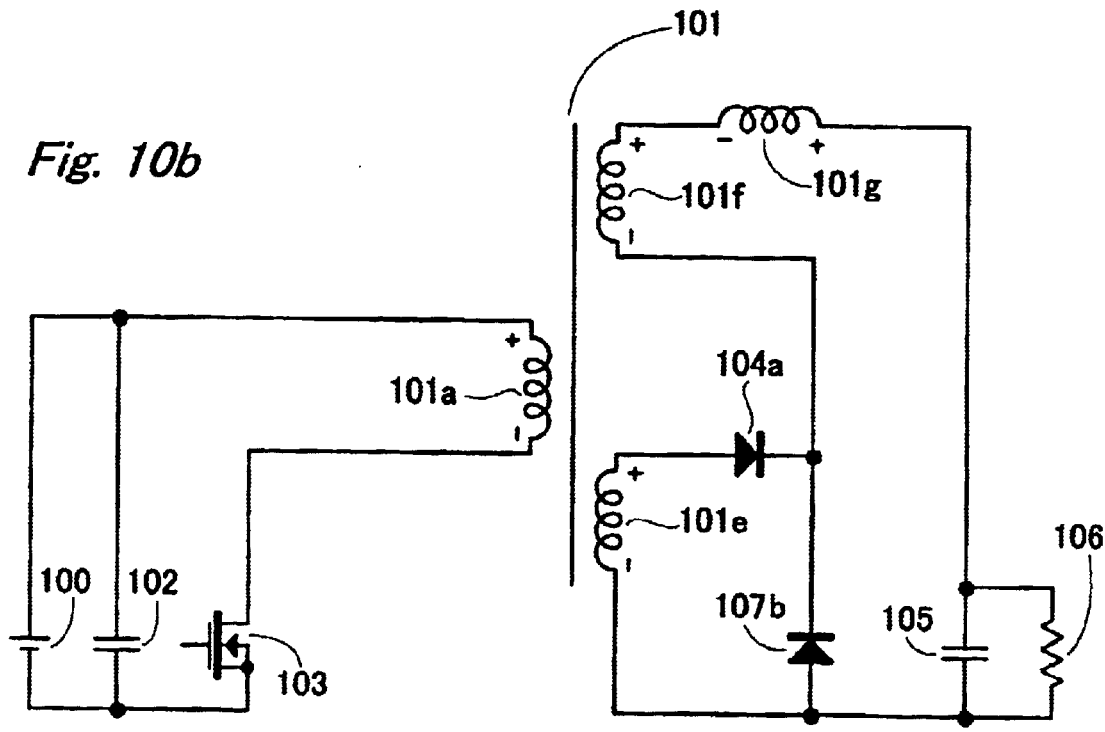
FIG. 10b is a circuit diagram showing a modification of the eighth embodiment.

In case that a higher efficiency is expected despite that a high frequency current flows, it may be possible to arrange such that the intermediate tap T1 and the input winding 101b are removed and the DC supply 100 is directly connected to the bypass capacitor 102 as shown in FIG. 10b.

Figure 11:
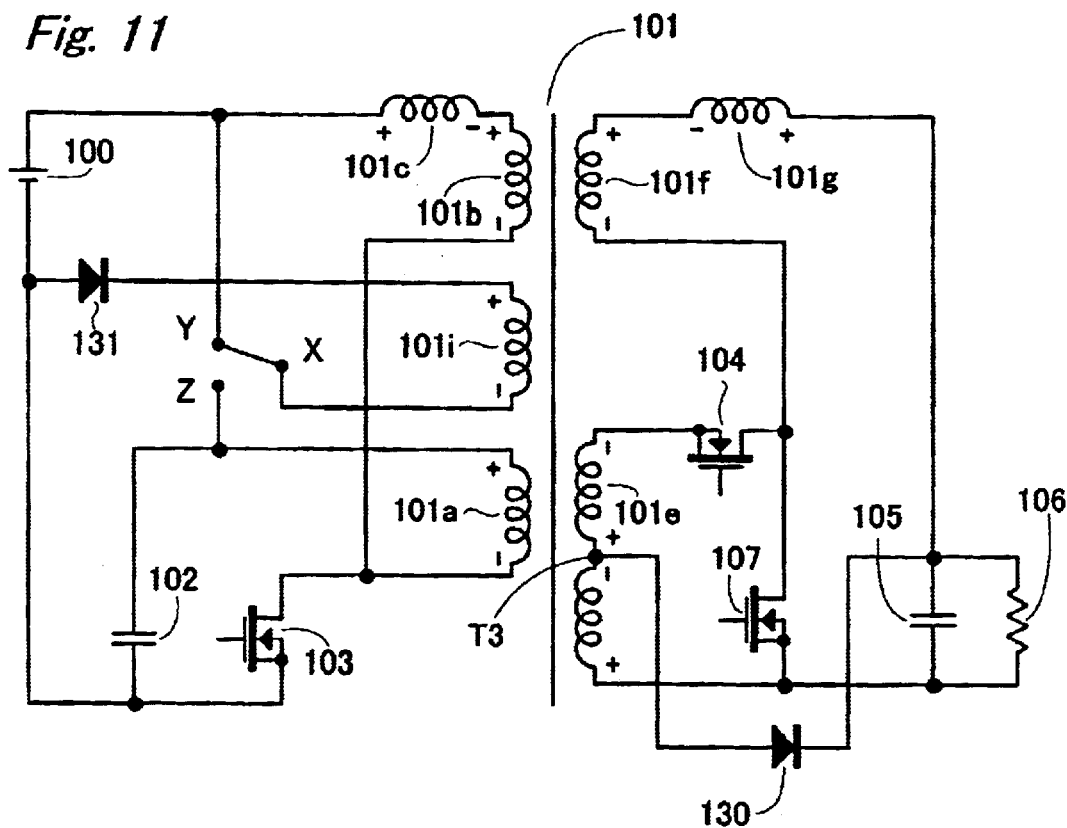
FIG. 11 is a circuit diagram depicting the ninth embodiment of the present invention.

FIG. 11 is a circuit diagram showing a construction of the ninth embodiment of the present invention. In this embodiment, the conventional apparatus shown in FIG. 30 is arranged such that the sub switch 108 and the clamping capacitor 109 are removed to make the construction simpler, while realizing a high efficiency. Removing the sub switch 103 and the clamping capacity 109 from the apparatus shown in FIG. 30, the function to restrict the voltage applied to the main switch 103 cannot be obtained. Therefore, in the ninth embodiment, the rectifying switch 104 on the secondary side is placed on the minus side of the secondary winding 101e, and an intermediate tap T3 is provided in the secondary winding 101e, connecting the tap T3 to the output via a diode 130. According to this arrangement, the voltage applied upon the main switch 103 is clamped as well as the fryback converter, and thus a part of the energy stored in the core is outputted via the diode 130.

It may be possible to clamp the voltage applied upon the main switch 103 by such an arrangement that an additional winding 101i and a diode 131 are provided on the primary side of the transformer so that the energy is recovered through the additional winding 101i and the diode 131. When the points X and Y shown in FIG. 11 are connected to each other, a part of the energy stored in the core is recovered to the input power source 100; while when the points X and Z are connected to each other, the energy is recovered to the bypass capacitor 102. Both cases have almost the same function.

The above-mentioned clamping circuit may be provided on the secondary side or the primary side, or both sides. By arranging such that after the energy stored in the core is released the main switch 103 becomes ON at the timing that the voltage on the main switch 103 becomes lowest so as to realize a so called quasi-resonating operation, hence the turn-on loss can be reduced.

Figure 12:
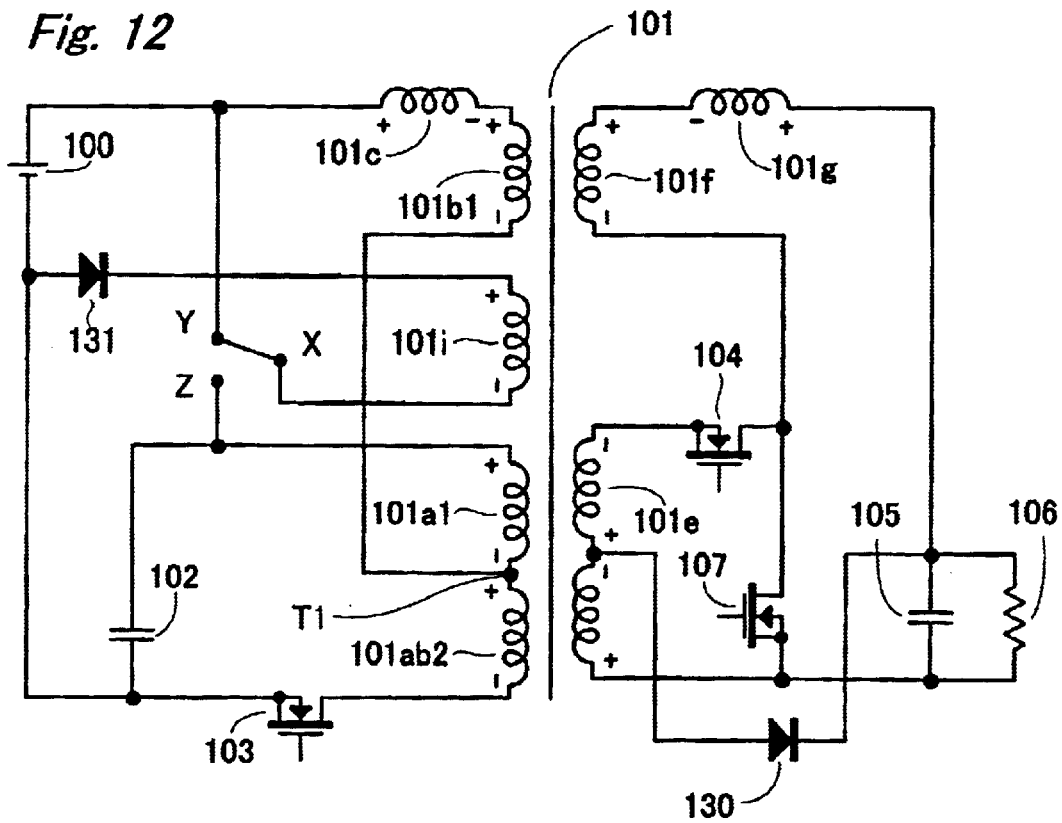
FIG. 12 is a circuit diagram illustrating the tenth embodiment of the present invention.

FIG. 12 is a circuit diagram showing a construction of the tenth embodiment of the present invention, where an intermediate tap is provided in the primary winding and an electric current is supplied to this tap. In the tenth embodiment, the apparatus shown in FIG. 2a is arranged such that the clamping apparatus explained in the night embodiment is provided instead of the sub switch 108 and the clamping capacitor 109 in order to realize a power supply apparatus with a high frequency but having a simpler construction. As well as the ninth embodiment, the clamping circuit can be provided on the primary side only or the secondary side only, or on both sides. Further, the turn-on loss can be reduced by conducting the quasi-resonating operation.

Figure 13:
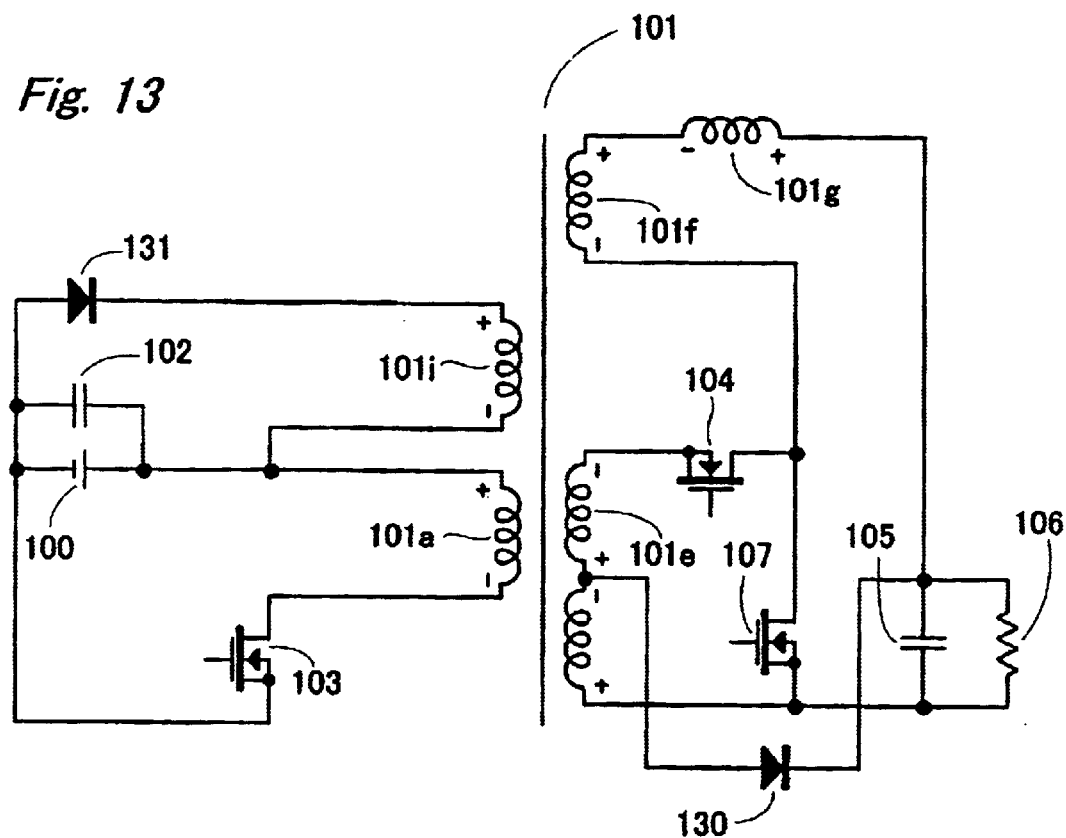
FIG. 13 is a circuit diagram representing the eleventh embodiment of the present invention.

FIG. 13 is a circuit diagram depicting a construction of the eleventh embodiment of the present invention. In the eleventh embodiment, the apparatus shown in FIG. 3a is arranged such that the clamping apparatus explained in the ninth or tenth embodiment is provided instead of the sub switch 108 and the clamping capacitor 109 in order to realize a power supply apparatus with a high frequency but having a simpler construction. The clamping circuit can be provided on the primary side only or the secondary side only, or both sides. Further, the turn-on loss can be reduced by conducting the quasi-resonating operation.

Figure 14:
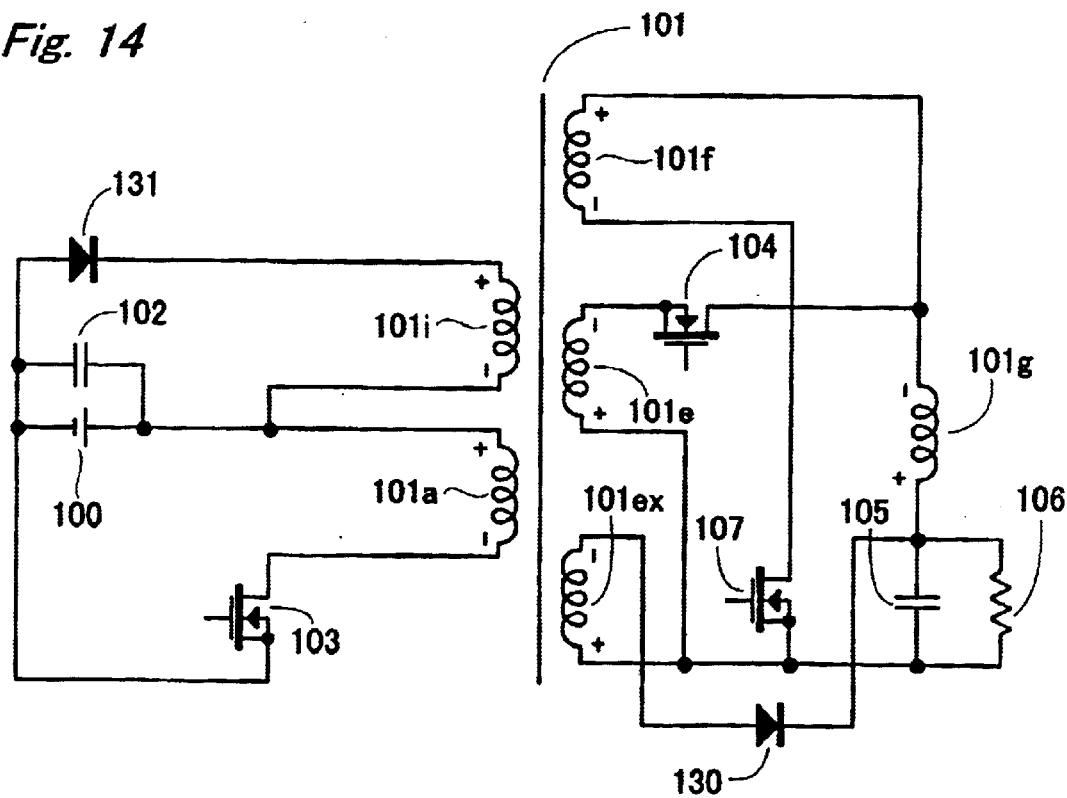
FIG. 14 is a circuit diagram showing a modification of the eleventh embodiment.

FIG. 14 is a circuit diagram illustrating a modification of the eleventh embodiment shown in FIG. 13. In a case that the winding 101g is an external inductance, the drain side of the rectifying switch 104 can be connected to the minus side of the winding 101g. In this case, even if the number of turns of the secondary winding 101e is reduced by the number of turns of the magnet flux canceling winding 101f, the equivalent circuit as that of FIG. 13 can be realized. It should be noted that an additional winding 101ex may be provided on the secondary side of the transformer, connecting the minus side of the winding 101ex to the anode side of the diode 130, or that the anode side of the diode 130 may be connected to the minus side of the secondary winding 101e. Further, it may be possible to provide an intermediate tap on the secondary winding 101e (without the additional winding 101ex) as in the eleventh embodiment in FIG. 13, connecting the anode side of the diode 130 to the tap.

In this modification, the clamping circuit can be provided on the primary side or the secondary side only, or on both sides. Further, the turn-on loss can be reduced by conducting the quasi-resonating operation.

Figure 15:
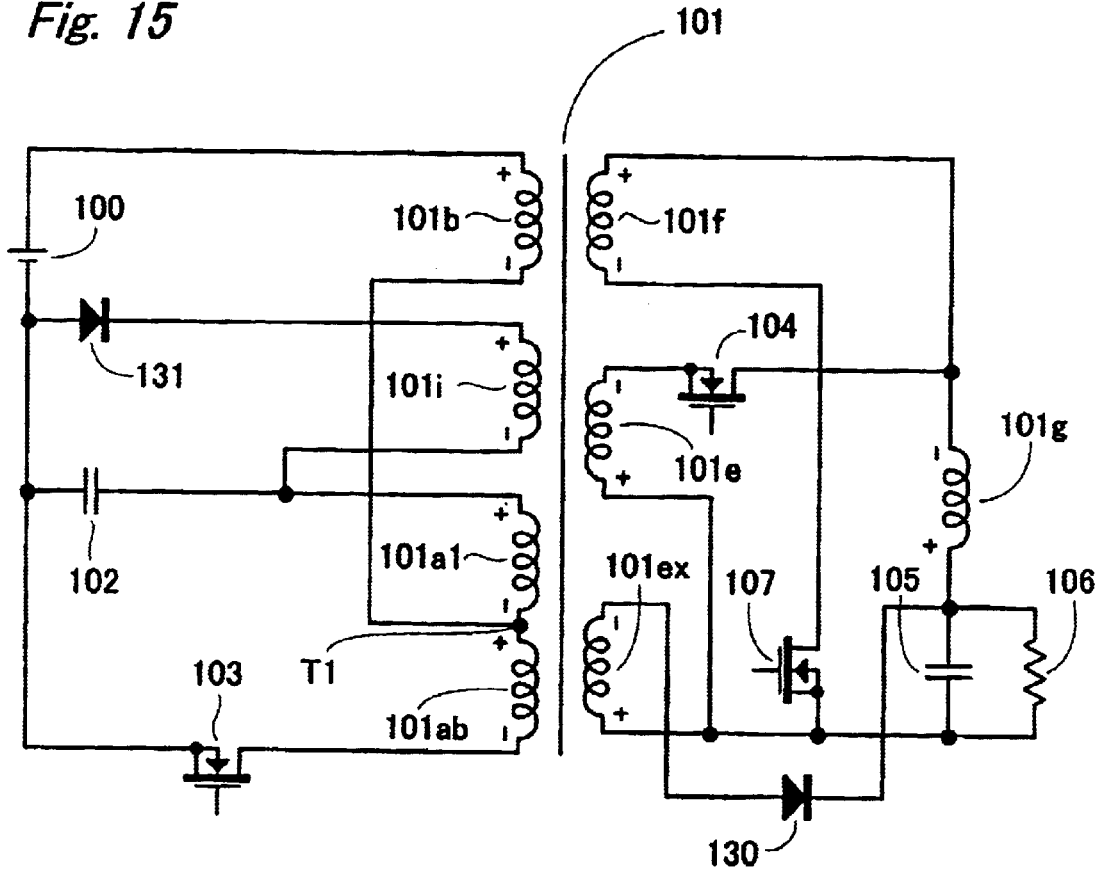
FIG. 15 is a circuit diagram depicting a further modification of the eleventh embodiment.

FIG. 15 is a circuit diagram depicting a further modification of the eleventh embodiment shown in FIG. 13, where an additional input winding 101*i* is added and an intermediate tap T1 is provided in the primary winding. The number of turns of the winding 101*ab* may be zero.

Figure 16:
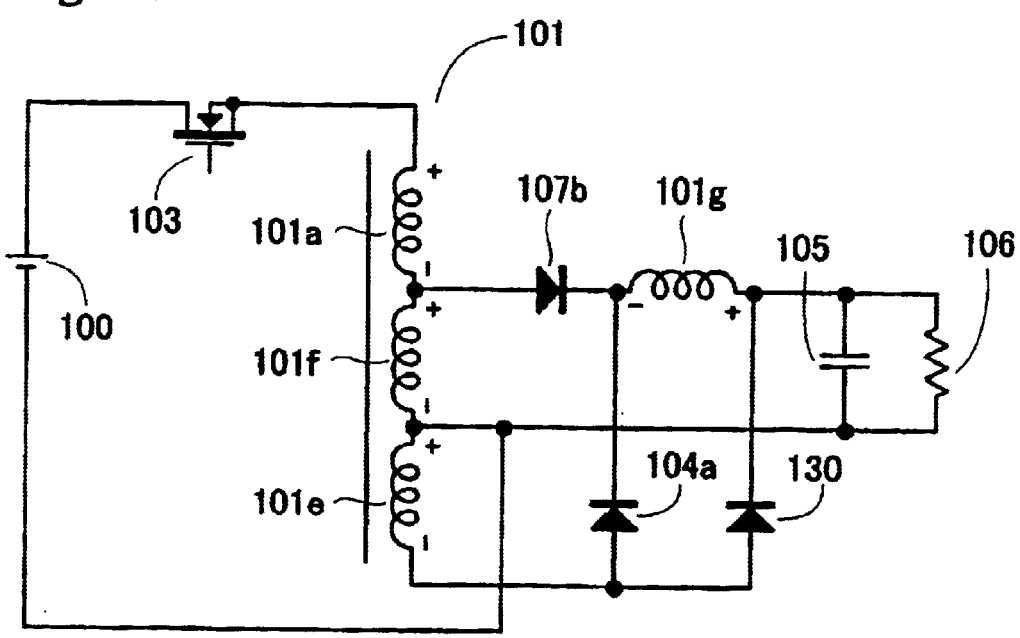
FIG. 16 is a circuit diagram illustrating a still further modification of the eleventh embodiment.

FIG. 16 is a circuit diagram representing a still further modification of the eleventh embodiment, where the apparatus is arranged as a non-isolated type. The function is the same as that of the apparatus in FIG. 13.

Figure 17A:
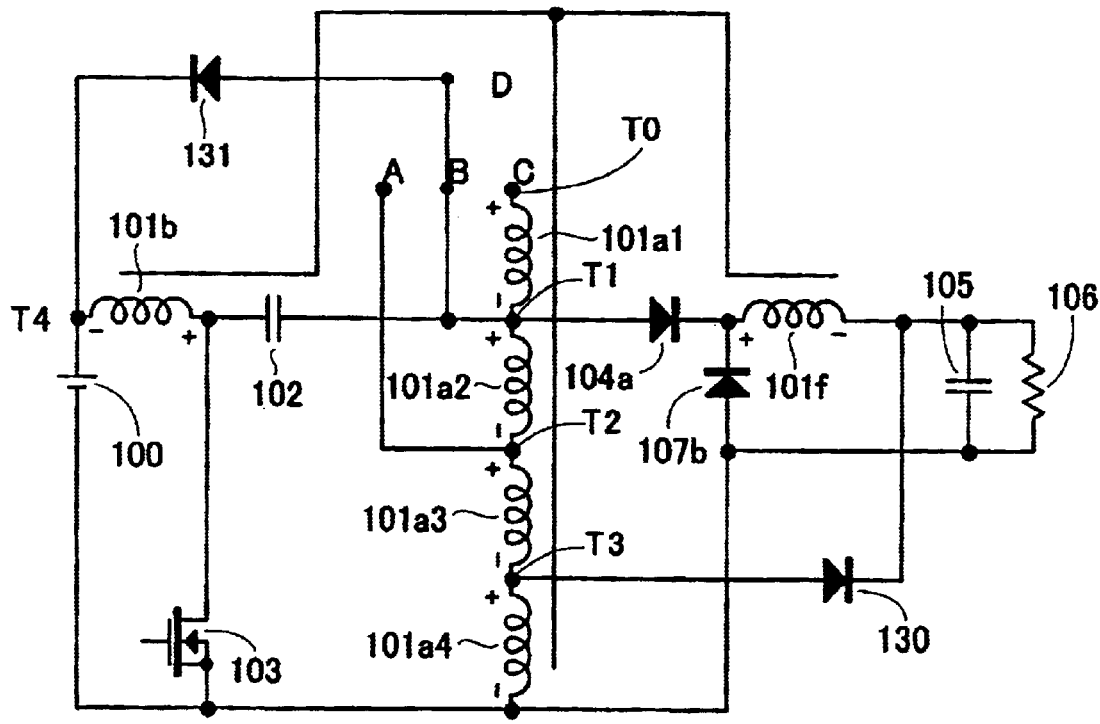
FIG. 17a is a circuit diagram representing the twelfth embodiment of the present invention.

FIG. 17*a* is a circuit diagram showing a construction of the twelfth embodiment of the present invention. This embodiment is an improvement of the non-isolated type converter mentioned in FIG. 35a of U.S. Pat. No. 6,304,460. In the twelfth embodiment, the sub switch and the clamping capacitor are removed and taps T0 to T3 are provided in the primary winding 101*a*. The tap T0, which is provided at the plus side windings 101*a*, is connected to the point C; the tap T1 provided between the windings 101*a*1 and 101*a*2 is connected to the diode 130 on the secondary side and the point B, the tap T2 provided between the windings 101*a*2 and 101*a*3 is connected to the point A, and the tap T3 provided between the windings 101*a*3 and 101*a*4 is connected to the diode 130 on the secondary side. It should be noted that the leakage inductor or the external inductor 101*c* and 101*g* are not shown in FIG. 17*a*. A so-called quasi-resonating operation, that the main switch 103 is made ON at the timing when the voltage of the main switch 103 becomes lowest after the energy stored in the core is released, can be applied in order to reduce the turn-on loss.

Figure 17B:
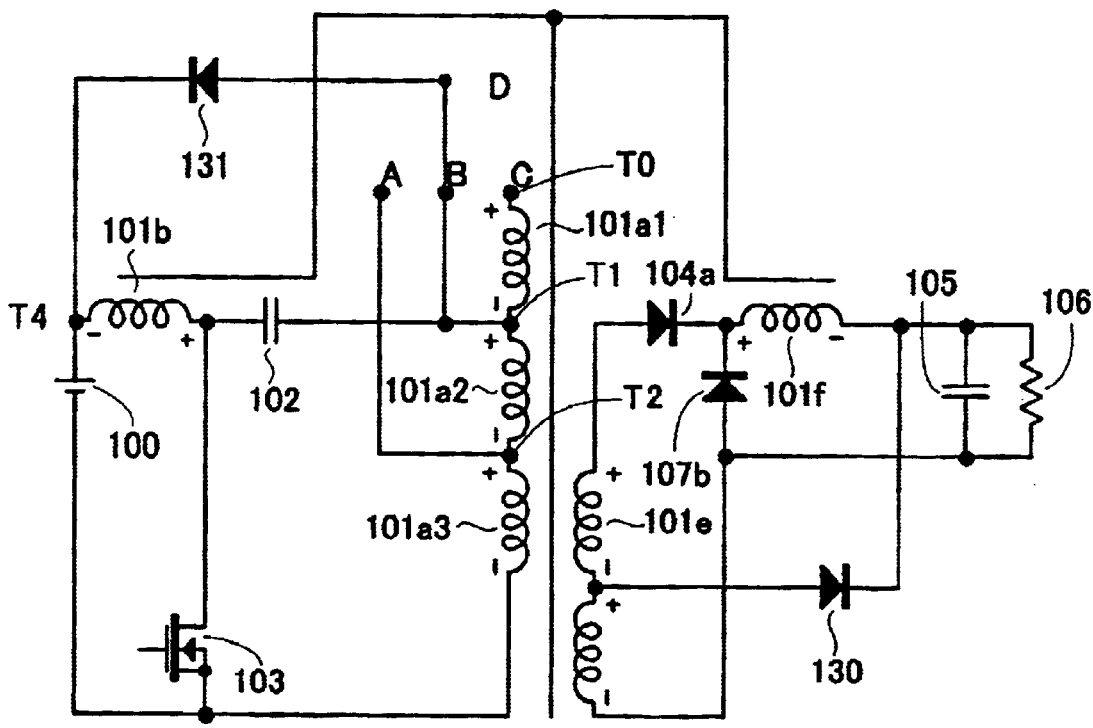
FIG. 17b is a circuit diagram showing a modification of the twelfth embodiment.
Figure 18:
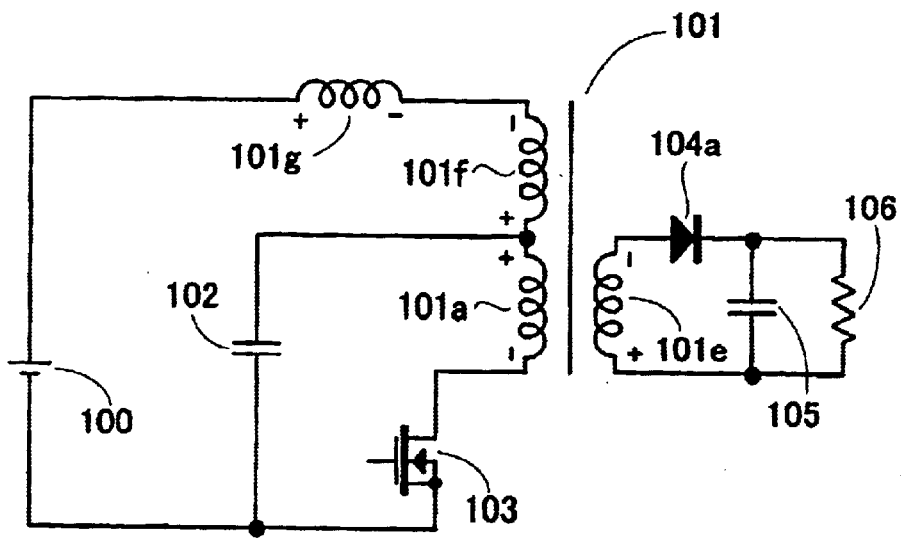
FIG. 18 is a circuit diagram depicting the thirteenth embodiment of the present invention.
Figure 19:
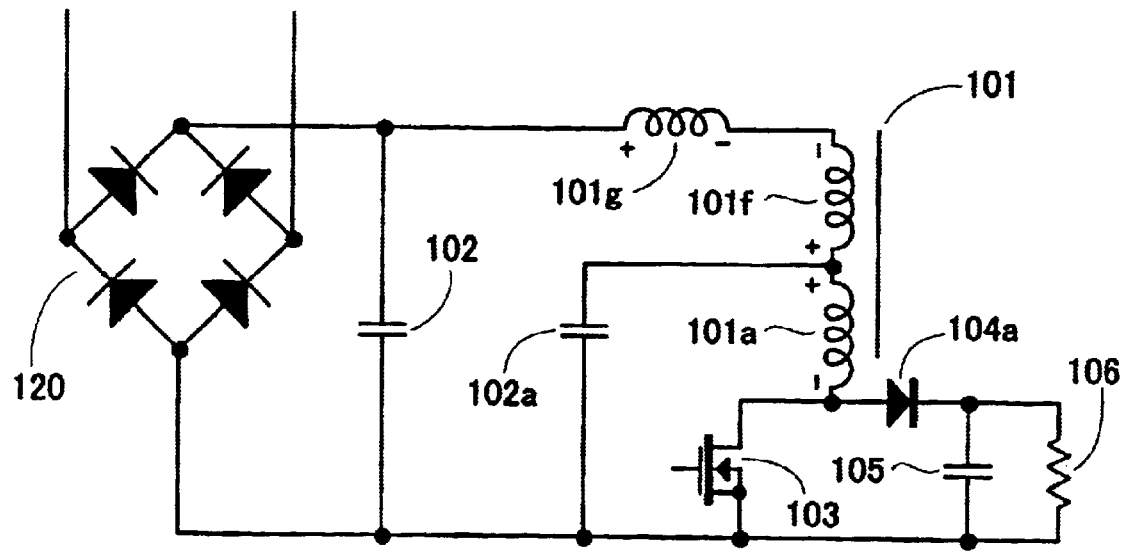
FIG. 19 is a circuit diagram illustrating a modification of the thirteenth embodiment.
Figure 20:
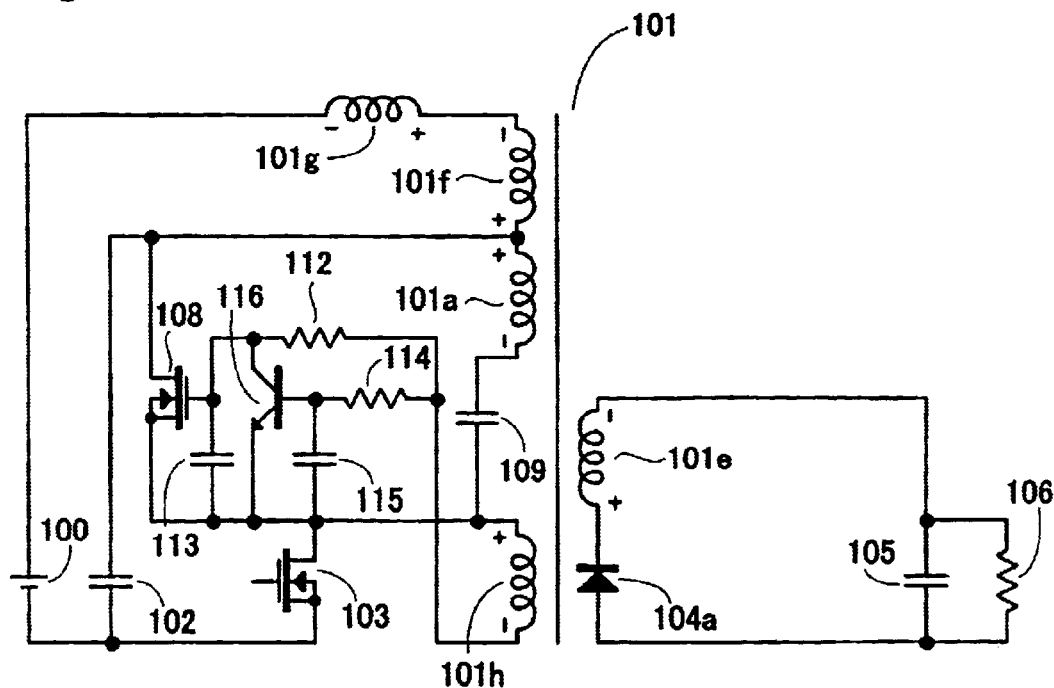
FIG. 20 is a circuit diagram representing a further modification of the thirteenth embodiment.
Figure 21:
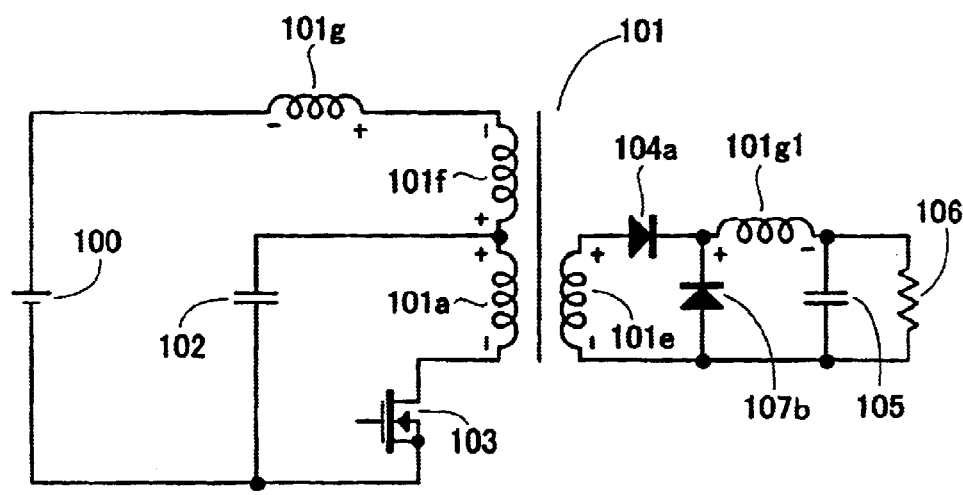
FIG. 21 is a circuit diagram showing a still further modification of the thirteenth embodiment.

FIG. 17*b* is a circuit diagram depicting a modification of the twelfth embodiment shown in FIG. 17*a*. This modification is an improvement of the non-isolated type converter mentioned in FIG. 35b of U.S. Pat. No. 6,304,460, where the sub switch and the clamping capacitor are removed and taps T1 and T2 are provided in the primary winding 101*a*. It should be noted that the leakage inductor or the external inductor 101*c* and 101*g* are not shown in FIG. 17*b*. So-called quasi-resonating operation, that the main switch 103 is made ON at the timing when the voltage of the main switch 103 becomes lowest after the energy stored in the core is released, can be applied in order to reduce the turn-on loss.

In the apparatuses shown in FIGS. 17*a* and 17*b*, the clamping voltage applied to the main switch 103 can be made high by connecting the anode side of the diode 131 on the primary side, i.e. the point D, to the intermediate tap T2 (point A); while by connecting the point D, i.e. the anode side of the diode 131, to the point B, i.e. the intermediate tap T1 provided between the primary windings 101*a*1 and 101*a*2, the clamping voltage applied to the main switch 101 can be made low. By connecting the points D and C only, the voltage applied upon the main switch 103 can be made lower.

FIGS. 18 to 21 are circuit diagrams showing a construction of the thirteenth embodiment of the present invention. In the embodiment shown in FIG. 18, the apparatus in FIG. 3*b* is arranged such that the magnetic flux canceling winding 101*f* and the inductor 101*g* are placed on the primary side of the transformer so as to cancel the DC magnetic flux thereby. In the embodiment shown in FIG. 19, the apparatus in FIG. 4*b* is modified in such a manner that the magnetic flux canceling winding 101*f* and the inductor 101*g* are placed on the primary side of the transformer; in FIG. 20, the apparatus in FIG. 8*b* is modified in such a manner that the magnetic flux canceling winding 101*f* and the inductor 101*g* are placed to the primary side; and in FIG. 21, the apparatus in FIG. 10*b* is modified in such a manner that the magnetic flux canceling winding 101*f* and the inductor 101*g* are placed on the primary side. In each apparatus, the inductor 101*g* may have a large leakage inductance, or an external inductance may be used.

Figure 22:
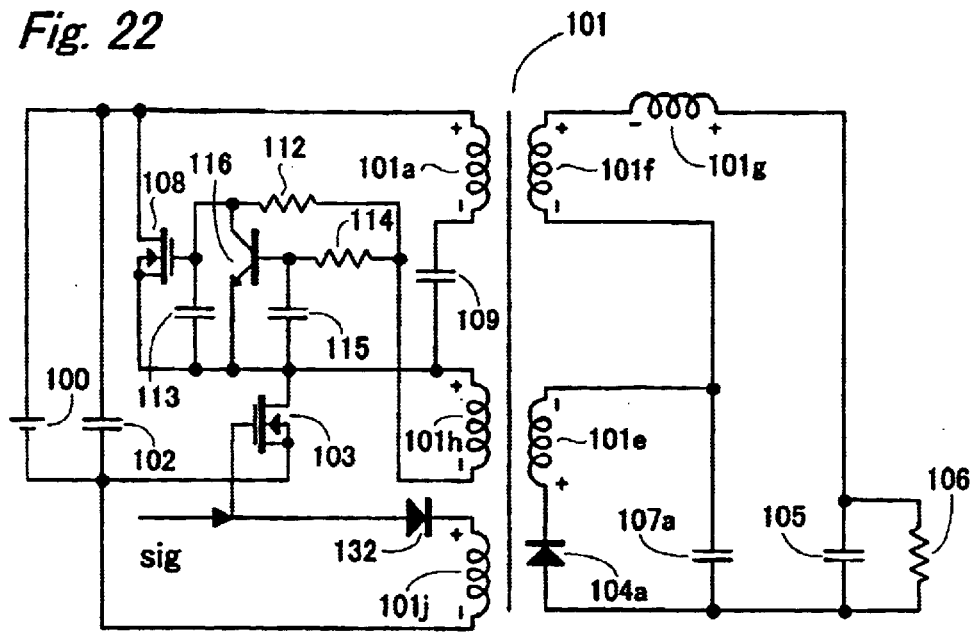

FIG. 22 is a circuit diagram showing a modification of the seventh embodiment, which is shown in FIG. 8*a*. In the apparatus in FIG. 22, the sub switch 108 is driven with the aid of an additional winding 101*h*, and another winding 101*j* for preventing that the main switch and the sub switch are made ON simultaneously and a diode 132 are added on the primary side, so that during the time when the sub switch 108 is being made ON the gate signal for the main switch 103 is stopped so as not to make the main switch 103 ON.

Figure 23:
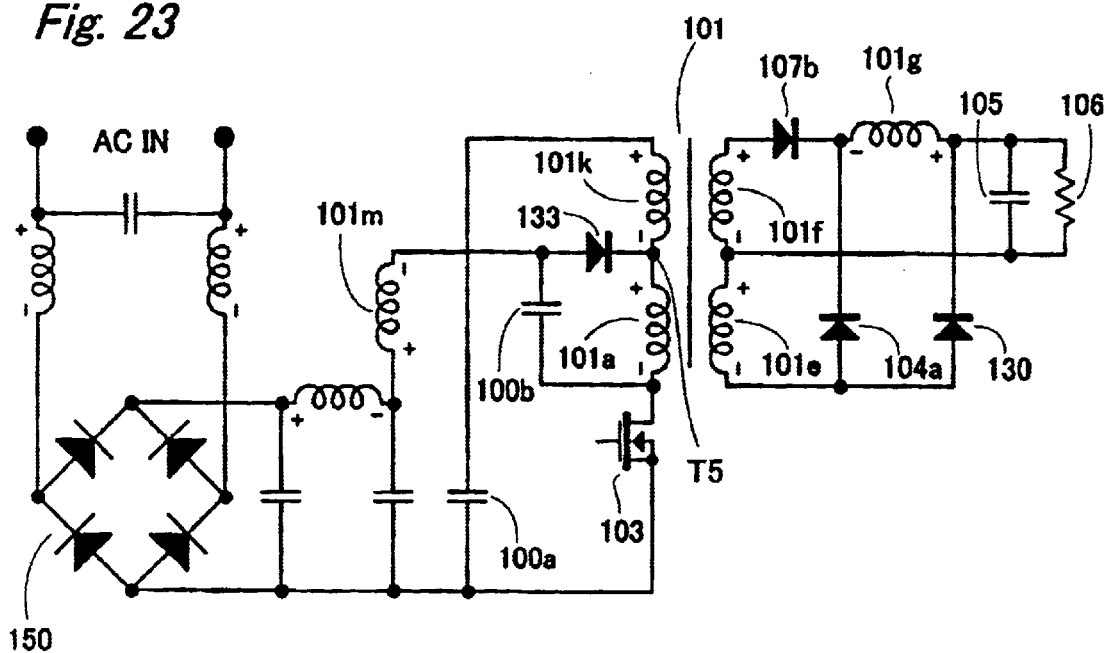
FIG. 23 is a circuit diagram illustrating the fourteenth embodiment of the present invention.

FIGS. 23 to 29 show embodiments where the present invention is applied to an AC-DC converter. In FIG. 23, the apparatus has the same construction shown in FIG. 14 where a power factor improving function is realized. In the apparatus depicted in FIG. 23, a high frequency wave is superimposed to the rectified current, which is obtained by rectifying the input current by a rectifying circuit 150, between the rectifying circuit 150 and the smoothing capacitor 100*a*, in order to widen the conductive angle. That is to say, a high frequency wave superimposing winding 101*k* is added to the plus side of the primary winding 101*a* and an intermediate tap T5 is provided between the windings 101*k* and 101*a*; the electric current coming from the source via the inductor 101*m* and the diode 133 is injected to the intermediate tap T5 to superimpose the high frequency wave there. In the event that the number of turns of the high frequency wave superimposing winding 101*k* is few, a capacitor 100*b* for superimposing high frequency may be added to compensate the improvement of the power factor.

Figure 24:
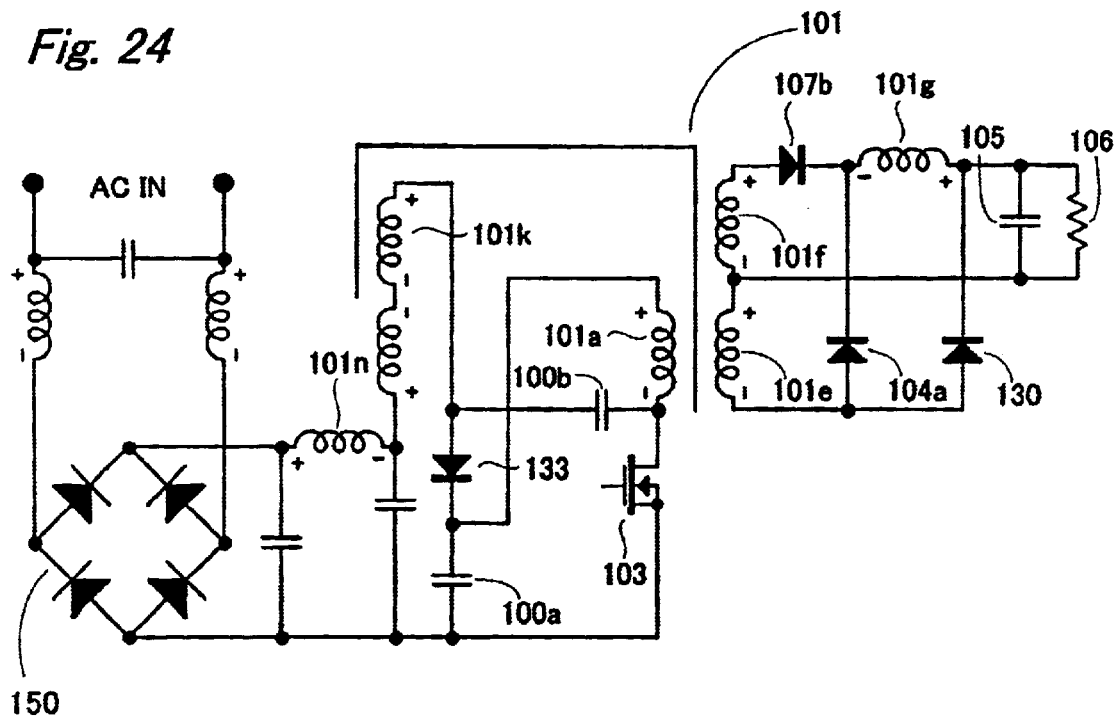
FIG. 24 is a circuit diagram representing a modification of the fourteenth embodiment.

FIG. 24 illustrate a circuit diagram of a modification of the fourteenth embodiment in FIG. 23, where a diode 133 is further provided between the high frequency wave superimposing winding 101*k* and the primary winding 101*a*. When the turn of the high frequency wave superimposing winding 101*k* is zero, the circuit works as the same as that shown in FIG. 23. In the apparatuses shown in FIGS. 23 and 24, the primary winding 101*a* may have an intermediate tap, to which the capacitor 101*b* is connected.

Figure 25:
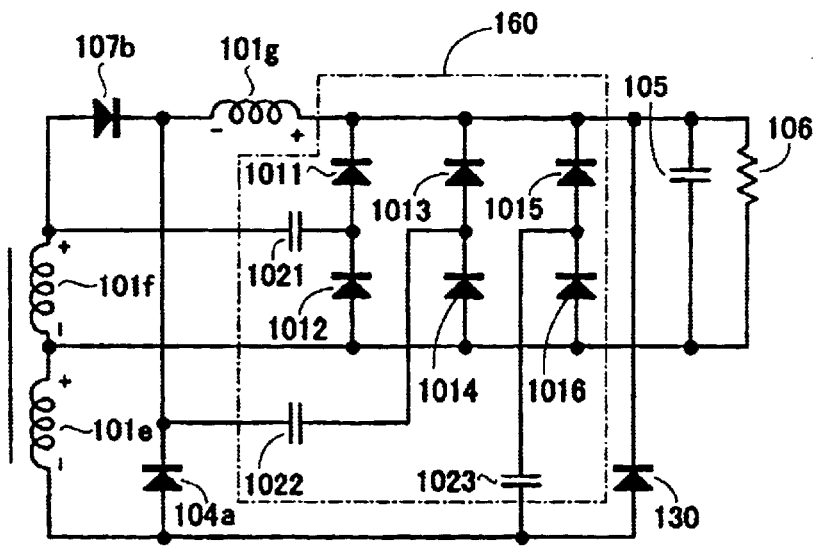
FIG. 25 is a circuit diagram showing a further modification of the secondary side of the fourteenth embodiment.

Further, a sunaber circuit may be provided on the secondary side of the apparatuses shown in FIGS. 14, 16, 23 and 24. FIG. 25 represents an example of the sunaber circuit. The sunaber circuit 160 is constituted of diodes 1011 to 1016, and capacitors 1021 to 1023, where the surge energy is rectified and then recovered to the output. As well as the apparatus shown in FIG. 14, the position of the magnetic flux canceling winding 101*f* and the diode 107*a* may be exchanged. Furthermore, each one of the directly connected diodes out of the diodes 1011 to 1016 may be changed to an inductor or a resistance as occasion demands.

Figure 26:
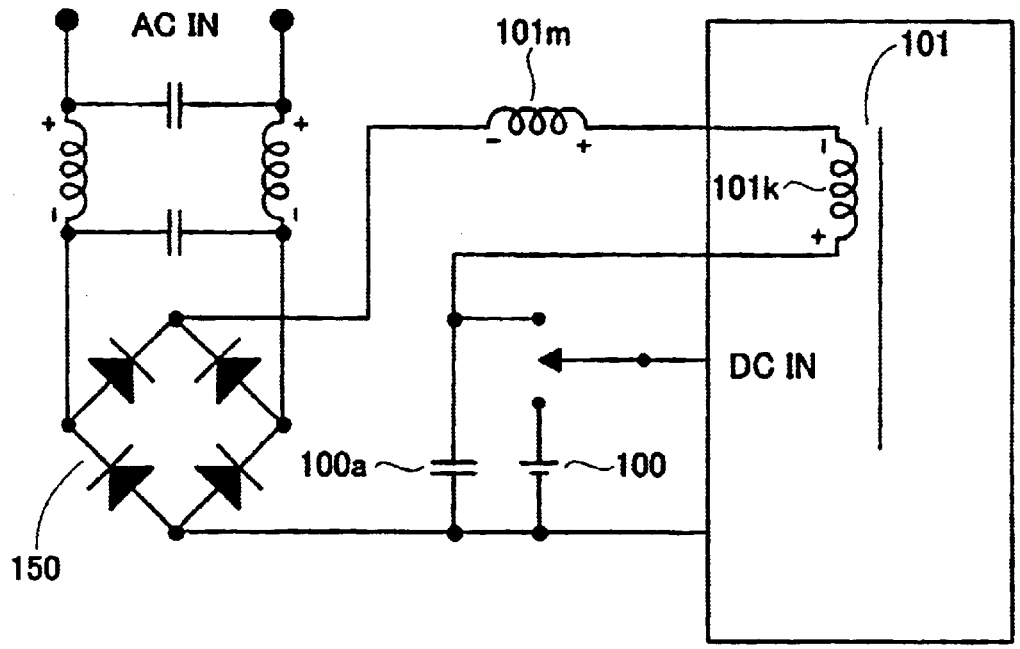
FIG. 26 is a circuit diagram depicting the fifteenth embodiment of the present invention.

FIGS. 26 to 29 show apparatus where an AC-DC converters according to the present invention is further improved so as to satisfy the standard of the harmonics. FIG. 26 is a circuit diagram showing a construction of the fifteenth embodiment, where a smoothing capacitor 100*a* is provided for the DC power supply 100; a high frequency wave superimposing winding 101*k* is provided in the transformer 101 so as to be connected between the rectifying circuit 105 and the smoothing capacitor 100*a* in series; further, a leakage inductor or an external inductor 101*m* is connected between the winding 101*k* and the rectifying diode 150. Under such a construction, the high frequency wave generated by the switching operation is superimposed to the rectified current, which is obtained by rectifying the alternative electric current source, so that a superimposed electric current is further rectified and thus the conductive angle can be widened and the harmonics can be reduced.

Figure 27:
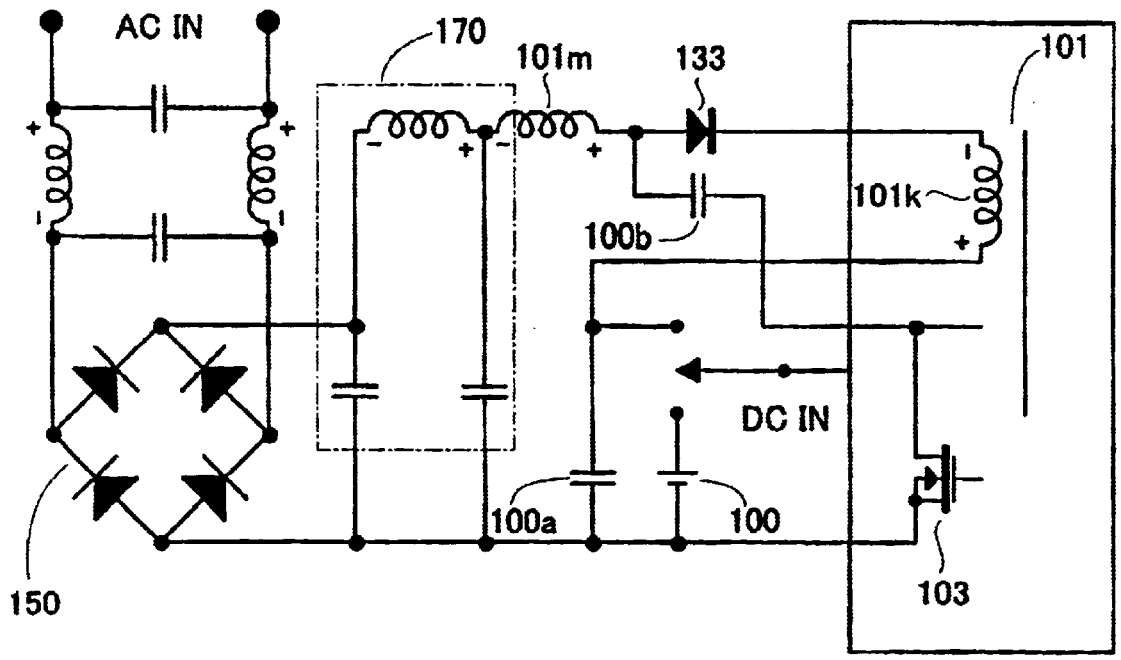
FIG. 27 is a circuit diagram illustrating a modification of the fifteenth embodiment.

FIG. 27 shows a modification of the apparatus shown in FIG. 26, where a π type filter 170 is provided between the winding 101k and the rectifying circuit 150 and a diode 133 and a high frequency superimposing capacitor 100 are added. Under such a construction, the efficiency becomes low, however, noise can be reduced. It should be noted that the capacitor 101b for superimposing high frequency used in FIGS. 23, 24 and 27 may be substituted by a diode, where the cathode side is arranged on the main switch side.

Figure 28:
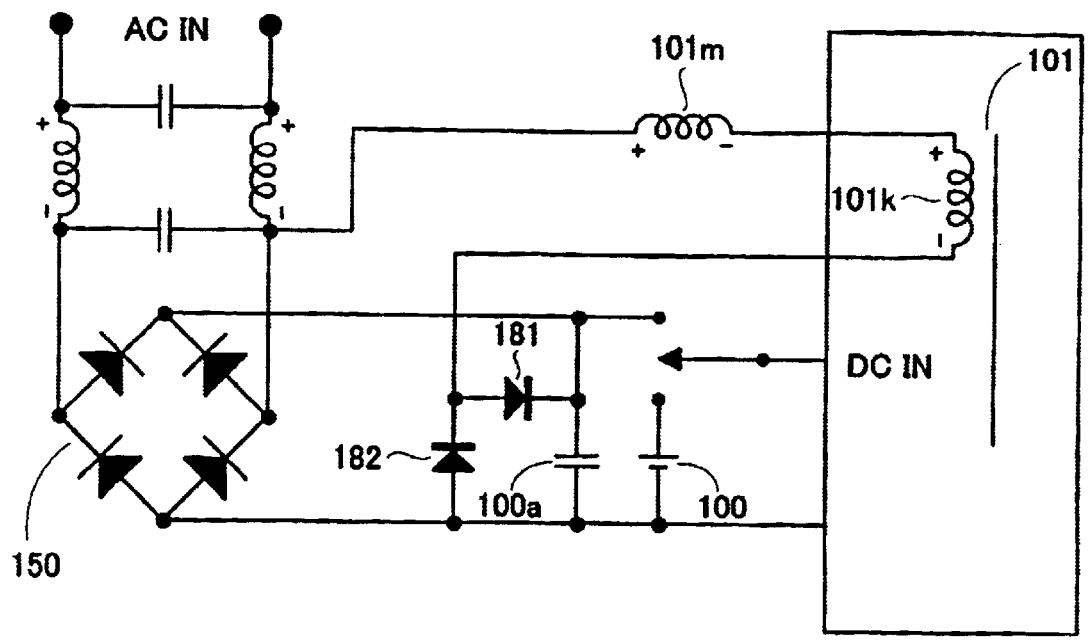
FIG. 28 is a circuit diagram representing a further modification of the fifteenth embodiment.

FIG. 28 is a further modification of the apparatus shown in FIG. 26, where the plus side of the winding 101k is connected to the alternative current supply side, two diodes 181 and 182, which are connected together in series, are connected to the smoothing capacitor 100a in parallel; the intermediate point between the diodes 181 and 182 and the minus side of the winding 101k are connected to each other. Under such a construction, the conductive angle is widened and thus the harmonics can be reduced.

Figure 29:
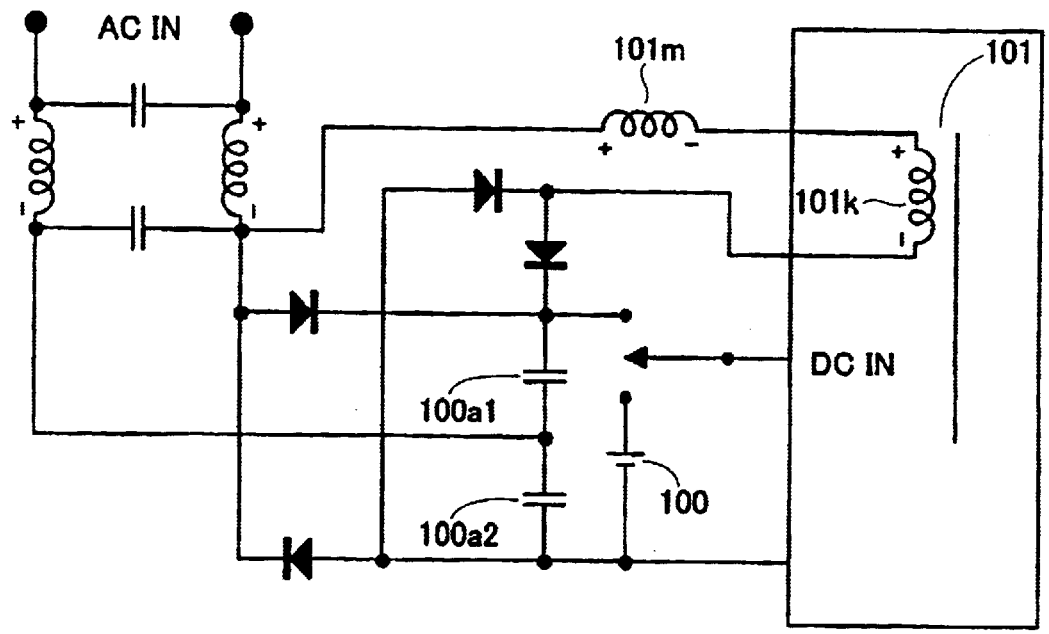
FIG. 29 is a circuit diagram showing a still further modification of the fifteenth embodiment.

FIG. 29 shows a further modification of the apparatus shown in FIG. 26, where the smoothing capacitors 100a1 and 100a2 are provided so as to conduct a voltage double rectification. Under such a connection, the conductive angle can be widen so that the harmonics can be reduced as well as the apparatus shown in FIG. 26.

In the above-mentioned embodiments and modifications, the rectifying diode can be substituted by a rectifying FET and the rectifying FET by a rectifying diode. Further, in the series circuits, the position of each element can be changed. Furthermore, it should be noted, many modification and alternation can be considered so far as a substantially equivalent circuit is realized.

As sated above, according to the power supply apparatus of the present invention, it is arranged such that an intermediate tap is provided between the alternative earth point and the alternative switching point of the primary winding of the switching transformer, and the input current is injected to the intermediate tap via the input winding; therefore, the copper loss can be reduced and then the efficiency can be improved by 0.2~0.4%. Further, according to the present invention, it is possible to arrange such that a magnetic saturation is not apt to be generated by providing a winding for canceling the DC magnetic flux, so that an iron loss can be reduced even in fryback converters, boost converters, forward converters, etc, which are operated under a condition that the DC magnetic flux is deviated. Furthermore, even in an apparatus where magnetic saturation is not apt to be generated by providing a winding for canceling the DC magnetic flux, according to the invention a general IC for controlling the switching element can be used.

What is claimed is:

1. A switching power supply comprising an input power source; an input winding, a transformer comprising an intermediate winding which has an end being connected to the ground and a magnetic flux canceling winding that is connected to said intermediate winding in series; a coupling capacitor for coupling the other end of said intermediate winding; a main switch for switching an electric current being supplied from said input power source via said input winding and an electric current going through said intermediate winding via said coupling capacitor; a first rectifying switch for rectifying an electric current going through said intermediate winding and said magnetic flux canceling winding, which are connected together in series, during when said main switch is being OFF; a second rectifying switch for rectifying an electric current going through said magnetic flux canceling winding during when said main switch is being ON; and a smoothing capacitor for smoothing an electric current going through said magnetic flux canceling winding; wherein said magnetic flux canceling winding is provided in a direction which is opposite to a direction of magnetic flux generated by said input winding and said intermediate winding; wherein said apparatus is arranged such that a third rectifying switch is provided between said intermediate winding and said input power supply so that a current rectified by said third rectifying switch is recovered to an input current, or such that an intermediate tap is provided in said intermediate winding, and a fourth rectifying switch is provided between said intermediate tap and a load so that a current rectified by said fourth rectifying switch is outputted to said load.

2. A switching power supply apparatus comprising an input power source; a transformer comprising a primary winding, a secondary winding, an input winding and a magnetic flux canceling winding being connected to said secondary winding in series; a main switch being connected to an end of said primary winding for switching an electric current going through said primary winding; a bypassing capacitor for bypassing the other end of said primary winding; a first rectifying switch for rectifying electric current going through said secondary winding and said magnetic flux canceling winding, which are connected to each other in series, during when said main switch is being OFF; a second rectifying switch for rectifying an electric current going through said magnetic flux canceling winding during when said main switch is being ON; a smoothing capacitor for smoothing an electric current going through said magnetic flux canceling winding; wherein an electric current coming from said input power source is supplied to said one end of primary winding, or to a first intermediate tap that is provided in said primary winding; wherein said magnetic flux canceling winding is provided in a direction that is opposite to a direction of magnetic flux generated by said primary winding, secondary winding and said input winding; and wherein said secondary winding comprises a second intermediate tap or an additional winding, and a third rectifying switch is provided between said second intermediate tap and said load or between said another winding and said load, so that an output from said secondary winding or said additional winding is supplied to said load via said third rectifying switch.

3. A switching power supply apparatus comprising an input power source; a transformer comprising a primary winding, a secondary winding, an input winding and a magnetic flux canceling winding being connected to said secondary winding in series; a main switch being connected to an end of said primary winding for switching an electric current going through said primary winding; a bypassing capacitor for bypassing the other end of said primary winding; a first rectifying switch for rectifying an electric current going through said secondary winding and said magnetic flux canceling winding, which are connected together in series, during when said main switch is being OFF; a secondary rectifying switch for rectifying an electric current going through said magnetic flux canceling winding during when said main switch is being ON; a smoothing capacitor for smoothing an electric current going through said magnetic flux canceling winding; wherein an electric current from said input power source is supplied to said one end of said input winding, or to a first intermediate tap which is provided in said primary winding, wherein said magnetic flux canceling winding is provided in a direction, which is opposite to a direction of magnetic flux generated by said primary winding, said secondary winding and said input winding; wherein said apparatus is arranged such that transformer further comprises a recovering winding and a third rectifying switch being connected to said recovering winding, so that an electric current from said recovering winding is supplied to said input power source or said bypassing capacitor via said third rectifying switch during when said main switch is being OFF.

4. A switching power supply apparatus comprising an input power source; a transformer comprising a primary winding an end of which is connected to said input power source, a secondary winding, a magnetic flux canceling winding being connected to said secondary winding in series; a main switch being connected to the other end of said primary winding for switching an electric current going through said primary winding; a first rectifying switch for rectifying an electric current going through said secondary winding and said magnetic flux canceling winding, that are connected to each other in series, during when said main switch is being OFF; a second rectifying switch for rectifying an electric current going through said magnetic flux canceling winding during when said main switch is being ON; a smoothing capacitor for smoothing an electric current going through said magnetic flux canceling winding, wherein said magnetic flux canceling winding is provided in a direction that is opposite to a direction of magnetic flux generated by said primary and secondary windings; said apparatus is arranged in such a manner that said secondary winding has an intermediate tap or an additional winding, and a third rectifying switch is provided between said intermediate tap or said another winding and a load, so that an output from said secondary winding or said additional winding is supplied to the load via said third rectifying switch.

5. A switching power supply apparatus comprising an input power source; a transformer comprising a primary winding an end of which is connected to said input power supply, a secondary winding, a magnetic flux canceling winding being connected to said secondary winding in series; a main switch being connected to the other end of said primary winding for switching an electric current going through said primary winding; a first rectifying switch for rectifying an electric current going through said secondary winding and said magnetic flux canceling winding, which are connected to each other in series, during when said main switch is being OFF; a second rectifying switch for rectifying en electric current going through said magnetic flux canceling winding during when said main switch is being ON; a smoothing capacitor for smoothing an electric current going through said magnetic flux canceling winding, wherein said magnetic flux canceling winding is provided in a direction which is opposite to a direction of magnetic flux generated by said primary and secondary winding; wherein said apparatus is arranged in such a manner that said transformer further comprises a recovering winding and that a third rectifying switch is provided between said recovering winding and said input power source, so that an electric current from said recovering winding is supplied to said input power source via said third rectifying switch during when said main switch is being OFF.

6. A switching power supply apparatus comprising an input power source; a transformer comprising a primary winding, a secondary winding, and a magnetic flux canceling winding; an external inductor being connected to said secondary winding in series; a main switch being connected to an end of said primary winding for switching an electric current going through said primary winding; a bypassing capacitor for bypassing the other end of said primary winding; a first rectifying switch for rectifying an electric current going through said secondary winding and said external inductor, which are connected to each other in series, during when said main switch is being OFF; a second rectifying switch for rectifying an electric current going through said magnetic flux canceling winding and said external inductor during when said main switch is being ON; a smoothing capacitor for smoothing an electric current going through said external inductor, wherein an electric current from said in put power source is supplied to said one end of said primary winding through said input winding, or supplied to an intermediate tap which is provided in said primary winding; wherein said magnetic flux canceling winding is provided in a direction which is opposite to a direction of magnetic flux generated by said primary and secondary windings; wherein said apparatus is arranged in such a manner that an intermediate tap or an additional winding is provided in said secondary winding and a third rectifying switch is provided between said intermediate tap or said additional winding and a load, so that an output from said secondary winding is supplied to the load via said third rectifying switch.

7. A switching power supply apparatus comprising an input power source; a transformer comprising a primary winding, a secondary winding, a magnetic flux canceling winding; an external inductor connected to said secondary winding in series; a main switch being connected to an end of said primary winding for switching an electric current going through said primary winding; a bypassing capacitor for bypassing the other end of said primary winding; a first rectifying switch for rectifying an electric current going through said secondary winding and said external inductor, which are connected to each other in series, during when said main switch is being OFF; a second rectifying switch for rectifying an electric current going through said magnetic flux canceling winding and said external inductor during when said main switch is being ON; a smoothing capacitor for smoothing an electric current going through said external inductor, wherein an electric current from said input power source is supplied to said one end of said primary winding through said input winding, or supplied to an intermediate tap which is provided in said primary winding; wherein said magnetic flux canceling winding is provided in a direction which is opposite to a direction of magnetic flux generated by said primary and secondary windings; wherein said transformer further comprises a recovering winding and a third rectifying switch is provided between said recovering winding and said input power source, so that an electric current from said recovering winding is supplied to said input power source or said bypassing capacitor via said third rectifying switch during when said main switch is being OFF.

8. A switching power supply apparatus comprising ah input power source; a transformer comprising a primary winding an end of which is connected to said input power source, a secondary winding, and a magnetic flux canceling winding; an external inductor connected to said secondary winding in series; a main switch being connected to the other end of said primary winding for switching an electric current going through said primary winding; a first rectifying switch for rectifying an electric current going through said secondary winding and said external inductor, that are connected to each other in series, during when said main switch is being OFF; a second rectifying switch for rectifying an electric current going through said magnetic flux canceling winding and said external inductor during when said main switch is being ON; a smoothing capacitor for smoothing an electric current going through said external inductor, said magnetic flux canceling winding is provided in a direction that is opposite to a direction of magnetic flux generated by said primary and secondary windings; wherein an intermediate tap or an additional winding is provided in said secondary winding and a third rectifying switch is provided between said intermediate tap or said additional winding and a load, so that an output from said secondary winding or said additional winding is supplied to the load via said third rectifying switch.

9. A switching power supply apparatus comprising an input power source; a transformer comprising a primary winding an end of which being connected to said input power source, a secondary winding, a magnetic flux canceling winding; an external inductor connected to said secondary winding in series; a main switch being connected to the other of said primary winding for switching an electric current going through said primary winding; a first rectifying switch for rectifying an electric current going through said secondary winding and said external inductor, that are connected to each other in series, during when said main switch is being OFF; a second rectifying switch for rectifying an electric current going through said magnetic flux canceling winding and said external inductor during when said main switch is being ON; a smoothing capacitor for smoothing an electric current going through said external inductor, wherein said magnetic flux canceling winding is provided in a direction that is opposite to a direction of magnetic flux generated by said primary and secondary windings; and wherein said transformer further comprises a recovering winding and a third rectifying switch is provided between said recovering winding and said input power source, so that an electric current from said recovering winding is supplied to said input power source via said third rectifying switch during when said main switch is being OFF.

10. A switching power supply apparatus comprising an input power source; a transformer comprising a primary winding, a secondary winding, a magnetic flux canceling winding being connected between said primary winding and said secondary winding; a main switch being connected to an end of said primary winding for switching an electric current going through said primary winding; an external inductor being connected to said secondary winding and said magnetic flux canceling winding in series; a first rectifying switch for rectifying an electric current going through said secondary winding and said external inductor, that are connected to each other in series, during when said main switch is being OFF; a second rectifying switch for rectifying an electric current going through said magnetic flux canceling winding and said external inductor during when said main switch is being ON; a smoothing capacitor for smoothing an electric current going through said external inductor, wherein said magnetic flux canceling winding is provided in a direction that is opposite to a direction of magnetic flux generated by said primary and secondary windings; end wherein a third rectifying switch is provided between said secondary winding and a load, or between an additional winding added to said secondary winding and said load, so that an output from said secondary winding or said additional winding is supplied to said load via said third rectifying switch.

11. A switching power supply apparatus according to any one of claims 1 and 2 to 9, wherein said input power source is an alternative power source and said apparatus further comprises a high frequency superimposing winding on the primary side of said transistor.

12. A switching power supply apparatus according to any one of claims 1 and 2 to 9, wherein said input power source is an alternative power source and said apparatus further comprises a high frequency superimposing capacitor or a high frequency superimposing diode on the primary side of said transformer.

* * * * *

UNITED STATES PATENT AND TRADEMARK OFFICE
CERTIFICATE OF CORRECTION

PATENT NO.       : 6,956,748 B2
APPLICATION NO.  : 10/431969
DATED            : October 18, 2005
INVENTOR(S)      : Nakagawa It is certified that error appears in the above-identified patent and that said Letters Patent is hereby corrected as shown below:

Column 5, Line 12, "being connected an end" should read -- being connected to an end --

Column 8, Lines 42-43, "in an direction" should read -- in a direction --

Column 9, Lines 17-18, "may further comprises" should read -- may further comprise --

Column 11, Line 41, "in put power source" should read -- input power source --

Column 13, Lines 33-34, "may further comprises" should read -- may further comprise --

Column 13, Lines 37-38, "may an" should read -- may be an --

Column 13, Lines 38-39, "may further comprises" should read -- may further comprise --

Column 15, Line 57, "are referred as" should read -- are referred to as --

Column 18, Line 32, "the firth embodiment" should read -- the fifth embodiment --

Column 20, Lines 26-27, "night embodiment" should read -- ninth embodiment --

Column 22, Line 33, "FIG. 24 illustrate" should read -- FIG. 24 illustrates --

Column 23, Line 26, "can be widen" should read -- can be widened --

Column 23, Line 35, "as sated above" should read -- as stated above --

Column 26, Line 13, "in put power source" should read -- input power source --

Column 26, Line 56, "comprising ah" should read -- comprising an --

UNITED STATES PATENT AND TRADEMARK OFFICE
CERTIFICATE OF CORRECTION

PATENT NO. : 6,956,748 B2
APPLICATION NO. : 10/431969
DATED : October 18, 2005
INVENTOR(S) : Nakagawa It is certified that error appears in the above-identified patent and that said Letters Patent is hereby corrected as shown below:

Column 28, Line 21, "end wherein" should read -- and wherein --

Column 28, Line 31, "said transistor" should read -- said transformer --

Signed and Sealed this

Fifteenth Day of August, 2006

JON W. DUDAS
*Director of the United States Patent and Trademark Office*